US012134535B2

(12) United States Patent
Tomatsu

(10) Patent No.: US 12,134,535 B2
(45) Date of Patent: Nov. 5, 2024

(54) IMAGE RECORDING APPARATUS

(71) Applicant: Brother Kogyo Kabushiki Kaisha, Nagoya (JP)

(72) Inventor: Yoshiya Tomatsu, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 223 days.

(21) Appl. No.: 17/804,863

(22) Filed: Jun. 1, 2022

(65) Prior Publication Data

US 2022/0388798 A1 Dec. 8, 2022

(30) Foreign Application Priority Data

Jun. 8, 2021 (JP) ................................ 2021-095878

(51) Int. Cl.
*B41J 11/00* (2006.01)
*B41J 15/04* (2006.01)
*B65H 23/02* (2006.01)
*B65H 23/032* (2006.01)

(52) U.S. Cl.
CPC .......... *B65H 23/02* (2013.01); *B41J 11/0025* (2013.01); *B41J 11/0055* (2013.01); *B41J 15/04* (2013.01); *B65H 23/0322* (2013.01); *B65H 2406/30* (2013.01)

(58) Field of Classification Search
CPC .... B41J 11/0025; B41J 11/0055; B41J 15/04; B65H 23/02; B65H 23/0322; B65H 2406/30; B65H 23/0208
See application file for complete search history.

(56) References Cited

U.S. PATENT DOCUMENTS

| | | | | |
|---|---|---|---|---|
| 5,625,398 A | 4/1997 | Milkovits et al. | | |
| 9,193,547 B2 * | 11/2015 | Suzuki | B65H 7/02 | |
| 2008/0067738 A1 * | 3/2008 | Shiga | B65H 1/04 271/226 | |
| 2020/0376859 A1 * | 12/2020 | Kanno | B41J 11/0085 | |
| 2021/0178783 A1 * | 6/2021 | Sugiura | B41J 11/007 | |

FOREIGN PATENT DOCUMENTS

| | | | |
|---|---|---|---|
| EP | 1342579 A1 * | 9/2003 | B41J 11/0025 |
| JP | H06-320815 A | 11/1994 | |
| JP | 2013-060265 A | 4/2013 | |
| JP | 2014-005120 A | 1/2014 | |
| JP | 2014-079977 A | 5/2014 | |

* cited by examiner

*Primary Examiner* — Christopher E Mahoney
*Assistant Examiner* — Marissa Ferguson-Samreth
(74) *Attorney, Agent, or Firm* — Merchant & Gould P.C.

(57) ABSTRACT

An image recording apparatus includes a pair of conveying rollers configured to convey a sheet in a conveying direction, a recording unit located downstream of the pair of conveying rollers in the conveying direction and configured to record an image on the sheet, a first side-guide located upstream of the pair of conveying rollers in the conveying direction and configured to come into contact with at least one of opposite ends of the sheet in a width direction orthogonal to the conveying direction. The first side-guide is movable in the width direction. The image recording apparatus further includes a second side-guide located downstream of the pair of conveying rollers and upstream of the recoding unit in the conveying direction, the second side-guide being configured to come into contact with at least one of opposite ends of the sheet in the width direction and movable in the width direction.

8 Claims, 13 Drawing Sheets

IMAGE RECORDING APPARATUS

CROSS REFERENCE TO RELATED APPLICATION

The present application claims priority from Japanese Patent Application No. 2021-095878, which was filed on Jun. 8, 2021, the disclosure of which is herein incorporated by reference in its entirety.

BACKGROUND

The following disclosure relates to an image recording apparatus.

There has been known a conventional printer as an example of an image recording apparatus. In the printer, a label sheet is conveyed in a conveyance path toward a printing position. In the conveyance path, two guide surfaces are disposed upstream of the printing position in a conveying direction of the label sheet. Each of the two guide surfaces is parallel to both the conveying direction and a vertical direction, and has a shape elongated in the conveying direction. A pair of conveying rollers configured to convey the label sheet is disposed downstream of the two guide surfaces in the conveying direction, and a pair of supplying rollers configured to supply the label sheet is disposed downstream of the two guide surfaces in the conveying direction.

When the label sheet is conveyed in the conveying direction, the two supplying rollers are spaced apart from each other so as not to nip the label sheet therebetween, and the two conveying rollers are in contact with each other. The two guide surfaces are in contact with the opposite ends of the label sheet in a width direction of the label sheet. As a result, it is possible to prevent the label sheet from being obliquely conveyed. The pair of conveying rollers nips and conveys the label sheet which is conveyed in a state in which the opposed end are guided by the two guide surfaces, to the printing position.

SUMMARY

The label sheet needs to be conveyed from the pair of conveying rollers to the printing position in a direction parallel to the conveying direction without being obliquely conveyed. In the conventional printer, the label sheet is conveyed so as to be pulled by the pair of conveying rollers while being guided by the two guide surfaces. Accordingly, the label sheet is conveyed, without being obliquely conveyed with respect to the conveying direction, on a conveyance plane which is located between the two guide surfaces and orthogonal to the two guide surfaces.

In the conventional printer, the pair of conveying rollers and the pair of supplying rollers are sufficiently spaced away from each other in the conveying direction and a length of each of the two guide surfaces in the conveying direction is sufficiently long so as to convey the label sheet without being obliquely conveyed. As a result, there is a possibility that a size of the conventional printer becomes large in the conveying direction.

An aspect of the disclosure relates to an image recording apparatus capable of reducing increase in size in a conveying direction.

In one aspect of the disclosure, an image recording apparatus includes a pair of conveying rollers configured to convey a sheet in a conveying direction, a recording unit located downstream of the pair of conveying rollers in the conveying direction and configured to record an image on the sheet, a first side-guide located upstream of the pair of conveying rollers in the conveying direction and configured to come into contact with at least one of opposite ends of the sheet in a width direction orthogonal to the conveying direction, the first side-guide being movable in the width direction, and a second side-guide located downstream of the pair of conveying rollers and upstream of the recoding unit in the conveying direction, the second side-guide being configured to come into contact with at least one of opposite ends of the sheet in the width direction and movable in the width direction.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

There will be described an image recording apparatus 100 according to a first embodiment of this disclosure in detail.

It is to be understood that the following embodiments are described only by way of example, and the disclosure may be otherwise embodied with various modifications without departing from the scope and spirit of the disclosure.

Definitions

In the following description, a movement from a starting point toward an ending point of an arrow is described as an orientation, and both ways on a line connecting the starting point and the ending point of the arrow is described as a direction.

An up and down direction 7 is defined on the basis of a state in which the image recording apparatus 100 is placed so as to be usable (a state illustrated in FIG. 1). In the image recording apparatus 100, a front and rear direction 8 is defined so that a side on which an output opening B13 is provided is decided as a front side. A right and left direction 9 is defined when the image recording apparatus 100 is viewed from a front side thereof.

Image Recording Method and Sheet

Figure 1A:
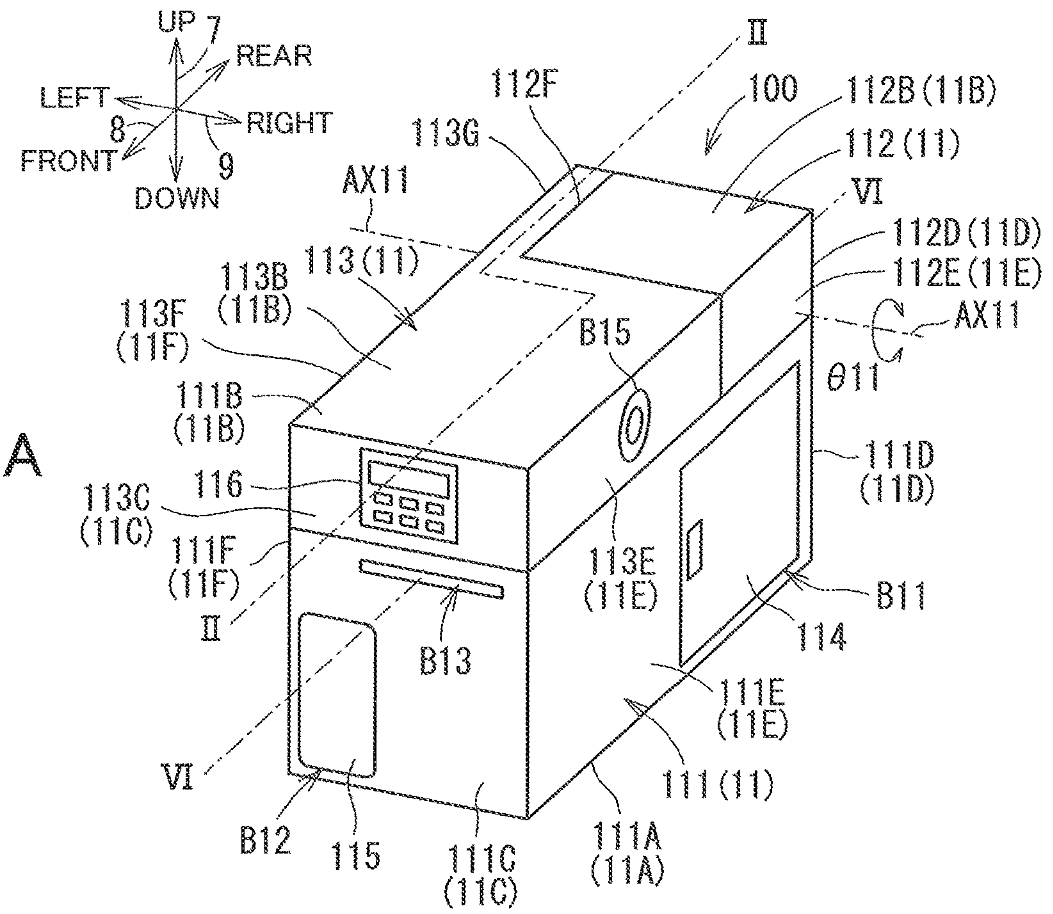
FIG. 1A is a perspective view illustrating an external appearance of an image recording apparatus.

In FIG. 1A, the image recording apparatus 100 is configured to record an image on a sheet S by an ink-jet recording method.

The sheet S is a roll paper having labels and includes a sheet core 41, a separator 42 and a plurality of labels 43. An example of the sheet core 41 is a cardboard core. The separator 42 is an example of a continuously-fed paper, and constitutes a roll body when being wound around the sheet core 41 from an inner side toward an outer side of the sheet core 41. Each of the plurality of labels 43 includes an adhesive layer, which is not illustrated, on a main surface 431 facing an inward-radial side R12, and the plurality of labels 43 are temporally adhered to a main surface 421 facing an outward-radial side R11 by the adhesive layer so as to be spaced apart from each other in a circumferential direction θ12 of a center axis AX12 of the separator 42. In each of the plurality of labels 43, a main surface 432 facing the outward-radial side R11 is a recorded surface on which an image is recorded. A perforation may be formed between adjacent two of the plurality of labels 43.

A plurality of kinds of sheets S respectively having different sheet-widths one another can be mounted on the image recording apparatus 100. The sheet-width is a distance between opposite ends of the sheet S in a width direction 9A. The width direction 9A is a direction in which the center axis AX12 extends.

Housing of Image Recording Apparatus

The image recording apparatus 100 includes a housing 11. The housing 11 has a substantially rectangular parallelepiped shape elongated in the front and rear direction, and has a size capable of being placed on a desk, a floor or a rack. The housing 11 includes a bottom wall 11A, an upper wall 11B, a front wall 11C, a rear wall 11D, a right wall 11E and a left wall 11F. The housing 11 defines an inner space SP11 (see FIG. 2) from an outside. The housing 11 further includes a housing casing 111, a rear housing cover 112 and a front housing cover 113.

The housing casing 111 is located below the rear housing cover 112 and the front housing cover 113, and has a substantially rectangular parallelepiped shape elongated in the front and rear direction. The housing casing 111 includes a bottom wall 111A, a front wall 111C, a rear wall 111D, a right wall 111E and a left wall 111F. The housing casing 111 defines a lower space SP111 (see FIG. 2), which is a lower part of the inner space SP11, from an outside. An upper end of the housing casing 111 is a periphery surrounding an opening AP111 (see FIG. 2) which faces upward. The opening AP111 is an upper end of the lower space SP111.

Figure 3A:
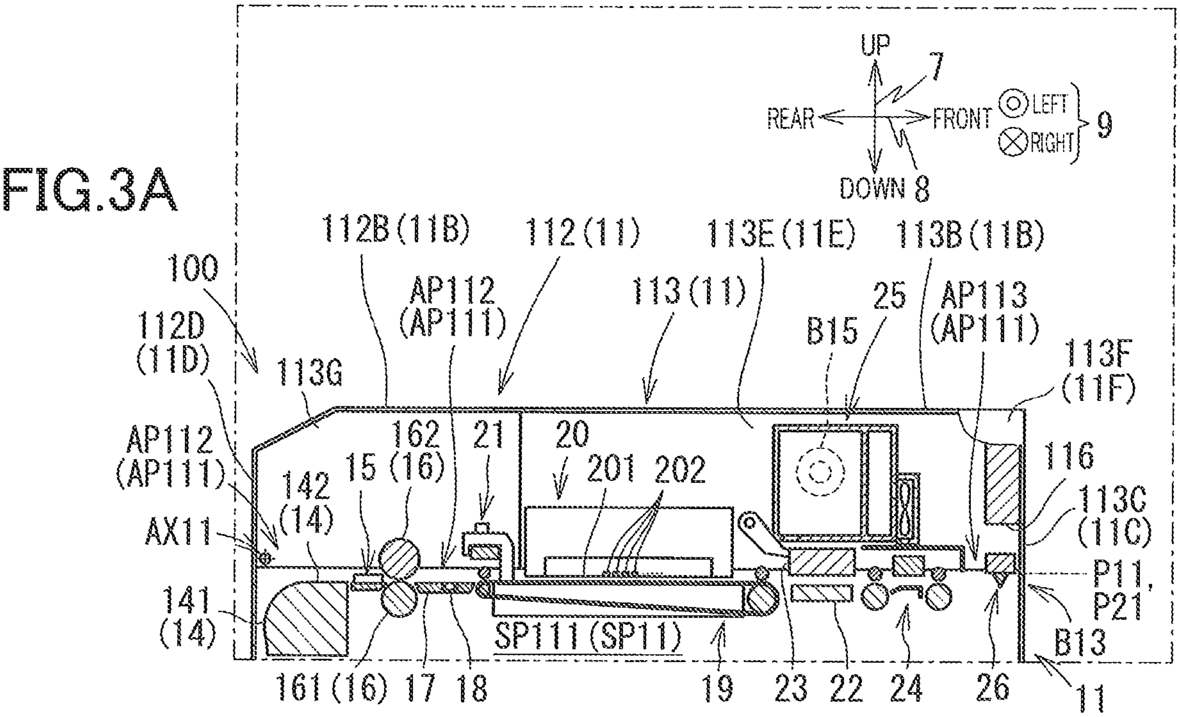
FIG. 3A is a schematic view illustrating a rear housing cover at a closed position and a front housing cover at a closed position.
Figure 3B:
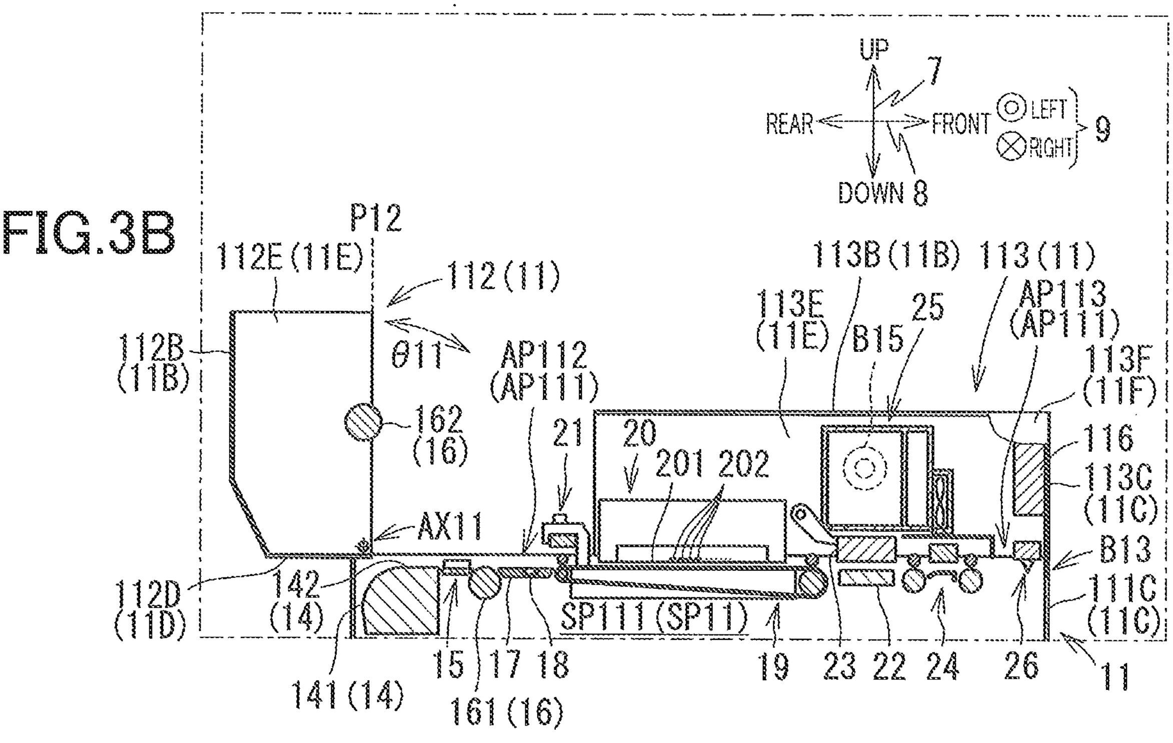
FIG. 3B is a schematic view illustrating the rear housing cover at an open position and the front housing cover at the closed position.

The rear housing cover 112 has a substantially rectangular parallelepiped shape elongated in the right and left direction. In FIG. 3, the rear housing cover 112 is pivotable around a rotation shaft AX11 in a circumferential direction θ11 between a closed position P11 and an open position P12. As illustrated in FIG. 3A, the rear housing cover 112 comes into contact with an upper end of the housing casing 111 at the closed position P11, and the rear housing closes 112 covers a rear opening AP112 which is a rear part of the opening AP111. As illustrated in FIG. 3B, the rear housing cover 112 is spaced apart from the upper end of the housing casing 111 in the circumferential direction 611 at the open position P12 so as to open the rear opening AP112. In the following description, there will be described the word "the rear housing cover 112" which means the rear housing cover 112 at the closed position P11 if there is not a specific mention. In FIG. 3B, an illustration of an arm 113G of the front housing cover 113 is dispensed with.

Figure 2:
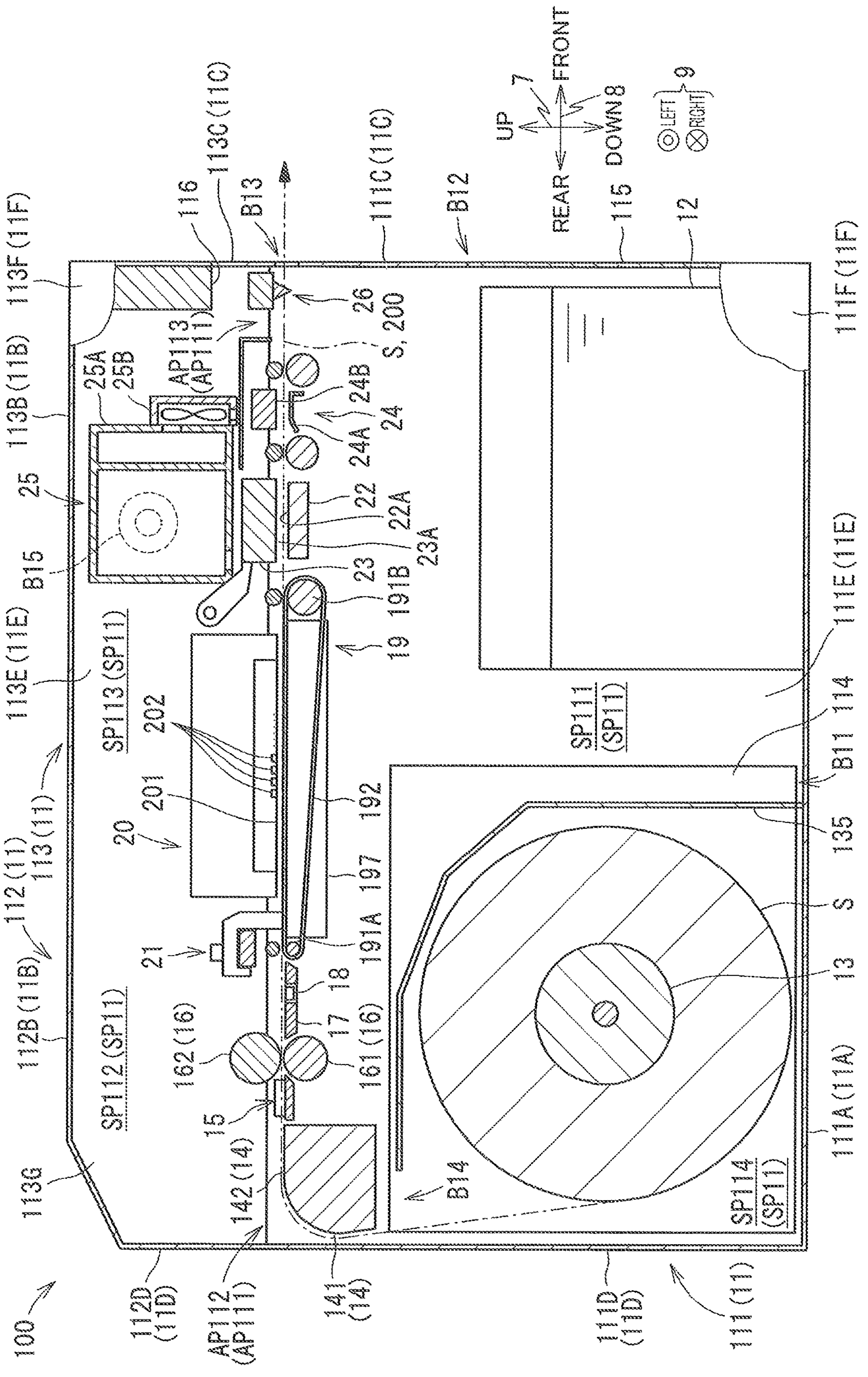
FIG. 2 is a schematic view illustrating an elevational cross-sectional view of the image recording apparatus taken along line II-II in FIG. 1A.

In FIG. 1A, the rear housing cover 112 includes an upper wall 112B, a rear wall 112D and a left wall 112F, and the rear housing cover 112 defines a rear upper space SP112, which is a rear upper part of the inner space SP11, from an outside. As illustrated in FIG. 2, the rear upper space SP112 is a part located above a rear portion of the lower space SP111 in the inner space SP11. As illustrated in FIG. 3A, a front end and a lower end of the rear housing cover 112 are open.

Figure 4:
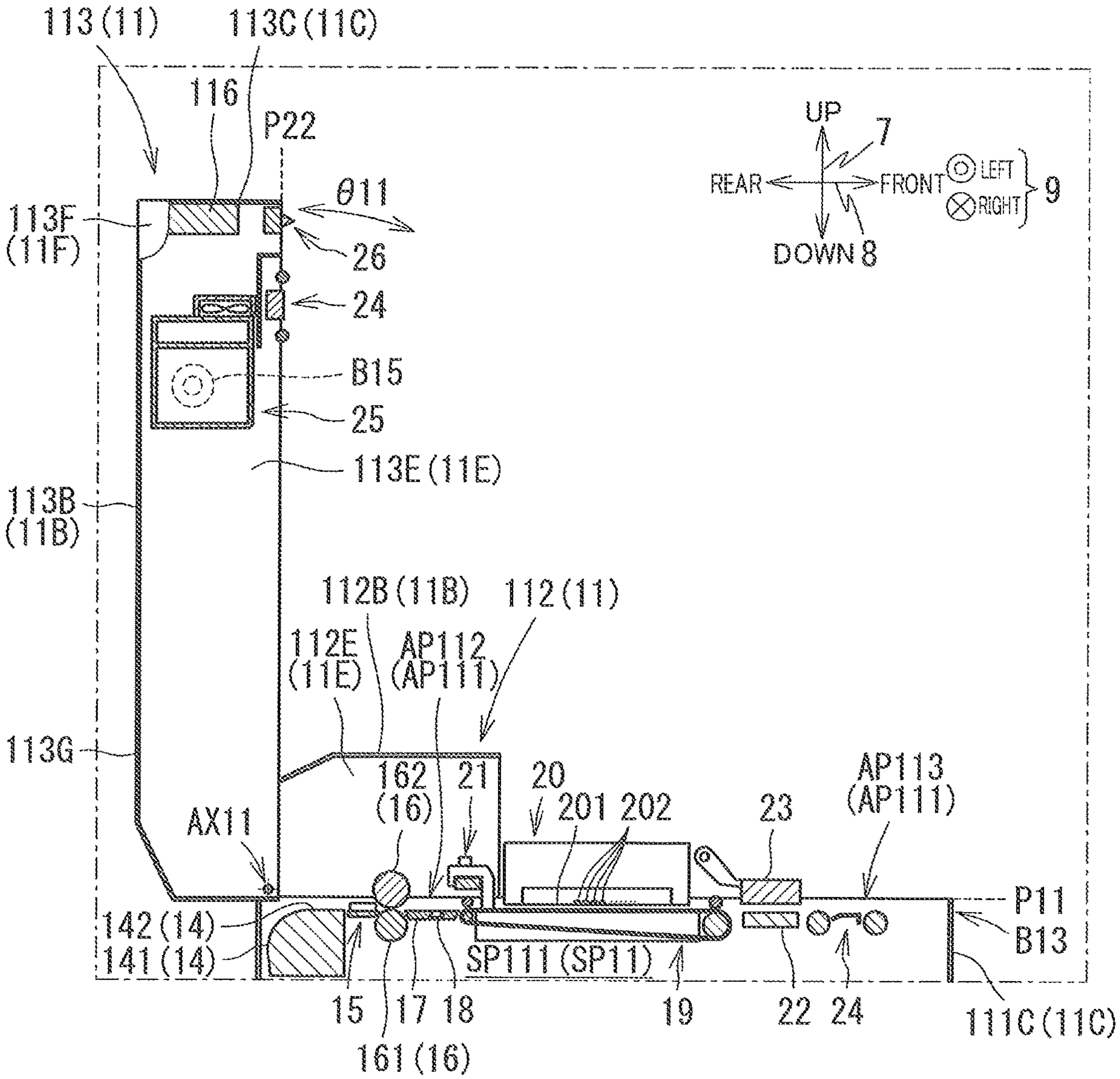
FIG. 4 is a schematic view illustrating the front housing cover at the open position.

In FIG. 3A and FIG. 4, the front housing cover 113 is pivotable around the rotation shaft AX11 in the circumferential direction 611 between a closed position P21 and an open position P22. As illustrated in FIG. 3A, the front housing cover 113 comes into contact with the upper end of the housing casing 111 at the closed position P21, and closes a front opening AP113 which is a part of the opening AP111 except the rear opening AP112. As illustrated in FIG. 4, the front housing cover 113 is spaced apart from the upper end of the housing casing 111 at the open position P22 so as to open the front opening AP113. In the following description, there will be described the word "the front housing cover 113" which means the front housing cover 113 at the closed position P21 if there is not a specific mention.

In FIG. 1A, the front housing cover 113 includes, as a body, an upper wall 113B, a front wall 113C, a right wall 113E and a left wall 113F, and the front housing cover 113 defines a front upper space SP113 from an outside. In FIG. 2, the front upper space SP113 is a space continuing to the rear upper space SP112 at a front portion and continuing to the lower space SP111 at an upper portion. As illustrated in FIG. 3A, a lower end of the front housing cover 113 is open.

In FIG. 1A, the front housing cover 113 further includes the arm 113G. The arm 113G extends rearward from a rear left corner of the body of the front housing cover 113, passes through a left side of the rear housing cover 112, and extends to a rear end of the housing casing 111.

In FIG. 1A, the bottom wall 11A of the housing 11 is the bottom wall 111A of the housing casing 111. The upper wall 11B is constituted of the upper walls 112B, 113B. The front wall 11C is constituted of the front walls 111C, 113C. The rear wall 11D includes the rear walls 111D, 112D. The right wall 11E is constituted of the right walls 111E to 113E. The left wall 11F includes the left walls 111F, 113F.

In FIG. 1A, the output opening B13 is formed in a vicinity of an upper end of the front wall 111C. The output opening B13 is a slit having a shape elongated in the right and left direction and piercing the front wall 111C. The sheet S on which the image has been recorded is discharged from the output opening B13.

An operation panel 116 which is operated by a user is located on the front wall 113C.

An opening B12 having a substantially rectangular shape when viewed from a front side is formed in a vicinity of a left end of the front wall 111C. A front cover 115 is located at the front wall 111C so as to open and close the opening B12. When the front cover 115 opens or closes, a tank (see FIG. 2) 12 is exposed or covered.

An opening B11 having a substantially rectangular shape when viewed in the right and left direction is formed in a vicinity of a rear end of the right wall 111E. A right cover 114 configured to open and close the opening B11 is located on the right wall 111E. The right cover 114 slides in the front and rear direction so as to open and close the opening B11. When the right cover 114 opens or closes, a roll supporter 13 (see FIG. 2) is exposed or covered.

Internal Configuration of Image Recording Apparatus

In FIG. 2, the image recording apparatus 100 includes the operation panel 116, the tank 12, the roll supporter 13, a tensioner 14, a rear side guide 15, a pair of conveying rollers 16, a lower guide 17, a sensor 18, a belt conveying mechanism 19, a recording head 20, a front side guide 21, a heater 22, a heater cover 23, an image reading unit 24, a cooling unit 25, and a cutter 26 in the inner space SP11.

The tensioner 14, the rear side guide 15, a drive roller 161 of the pair of conveying rollers 16, the lower guide 17, the belt conveying mechanism 19, the heater 22, and a white reference board 24A of the image reading unit 24 are supported by the left wall 111F and the right wall 111E of the housing casing 111 so as to extend in the right and left direction.

A pinch roller 162 of the pair of conveying rollers 16 is supported by the left wall 112F and a right wall 112E of the rear housing cover 112 so as to extend in the right and left direction. A front side guide 21 extends in the right and left direction in a space between the left wall 112F and the right wall 112E of the rear housing cover 112.

A CIS 24B, the cooling unit 25, and the cutter 26 of the image reading unit 24 are supported by the left wall 113F and the right wall 113E of the front housing cover 113 so as to extend in the right and left direction.

Figure 9:
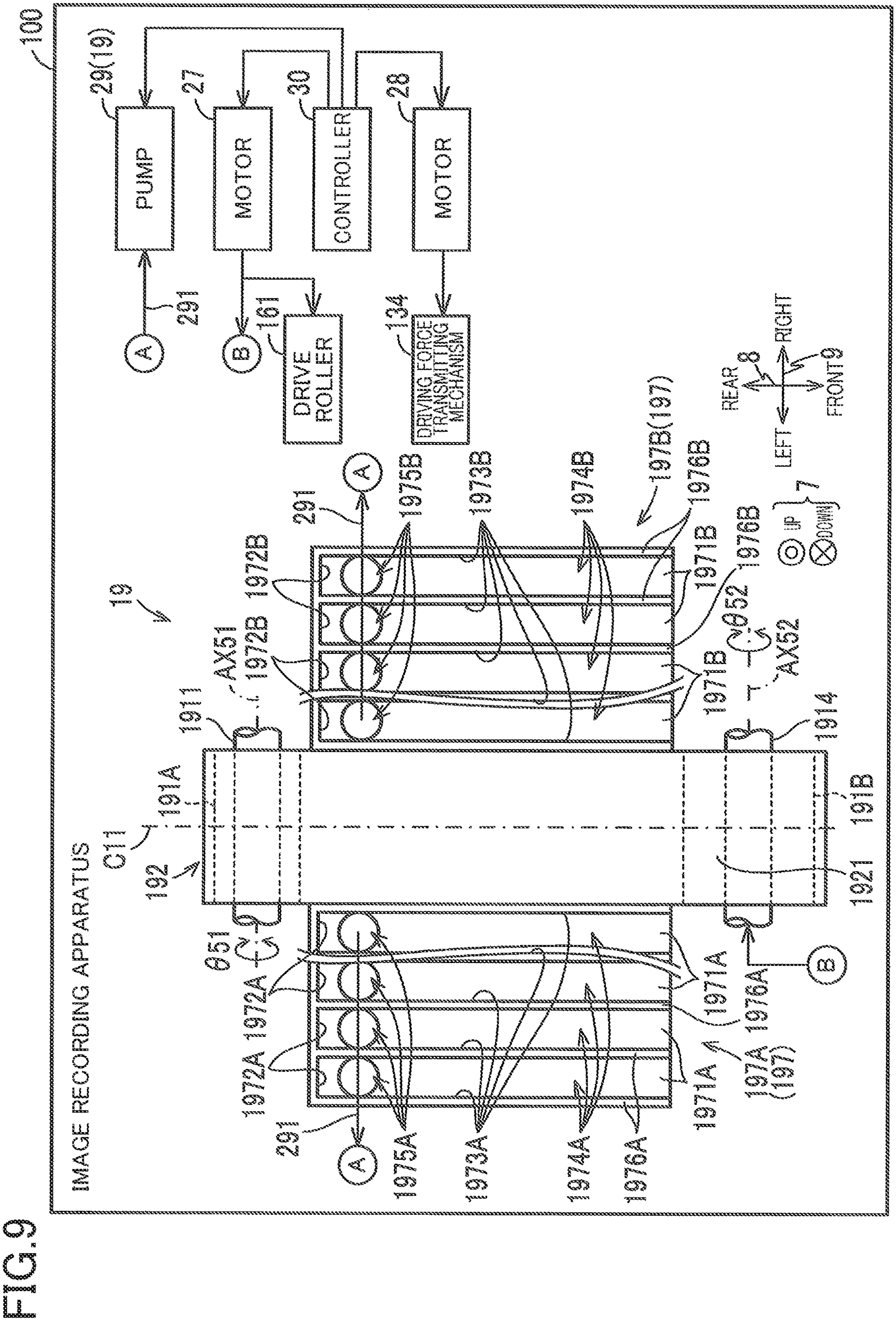
FIG. 9 is a block diagram of the image recording apparatus.

In FIG. 9, the image recording apparatus 100 further includes motors 27, 28, a pump 29, and a controller 30.

Tank

In FIG. 2, the tank 12 is located just rear of the front cover 115 on the bottom wall 111A so as to store ink in the tank 12. The ink in the tank 12 is supplied to the recording head 20 via an ink tube, which is not illustrated.

Roll Supporter

A roll accommodating space SP114 is defined by a partition wall 135 on the left side of the opening B11 in the lower space SP111. The roll accommodating space SP114 is isolated from the recording head 20 and the like by the partition wall 135. A space B14 extending from the right wall 111E to the left wall 111F and having an elongated shape is formed in a space between an end of the partition wall 135 and the rear wall 111D. The sheet S conveyed between the roll supporter 13 and the tensioner 14 passes through the space B14.

Figure 5A:
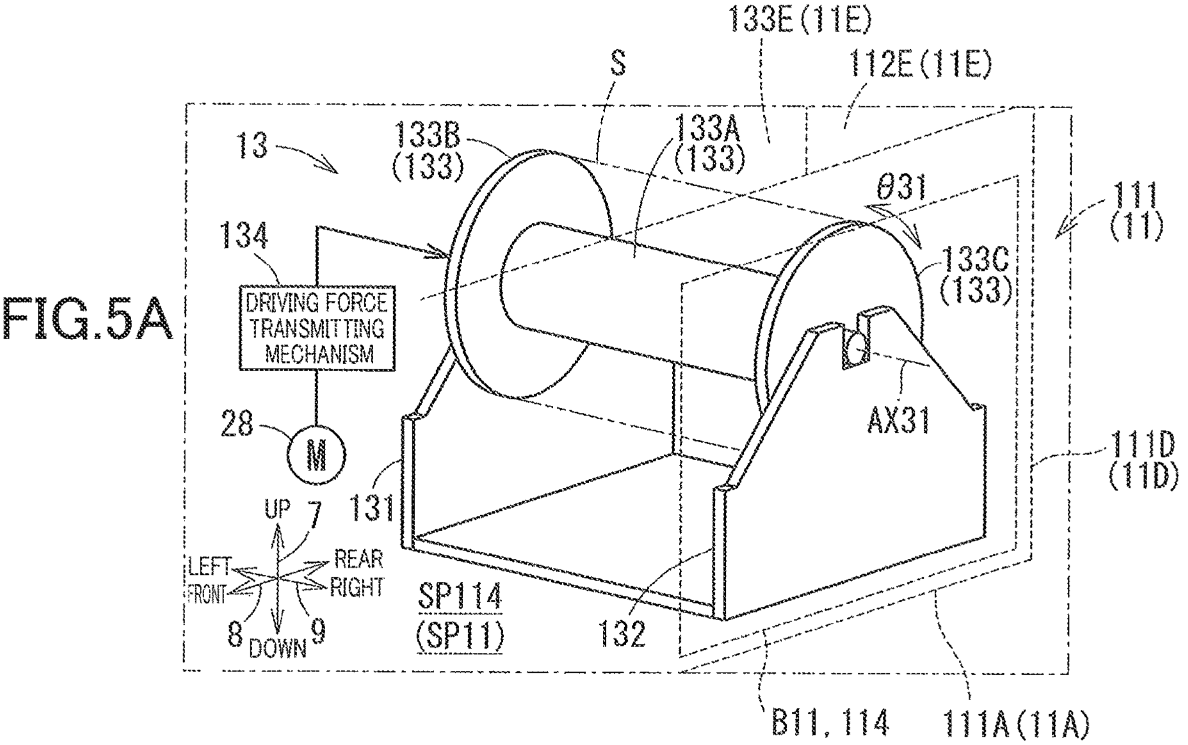
FIG. 5A is a perspective view illustrating an external appearance of a roll supporter.

In FIG. 5A, the roll supporter 13 is located in the roll accommodating space SP114 and supports the sheet S which constitutes the roll body so as to be rotatable around the center axis AX12 in the circumferential direction θ12. The roll supporter 13 includes a left supporter 131, a right supporter 132, a roll holder 133 and a driving force transmitting mechanism 134.

The left supporter 131 and the right supporter 132 are plate-like members respectively extend upward from positions on the bottom wall 111A spaced apart from each other in the right and left direction. The left supporter 131 and the right supporter 132 extend in each of the up and down direction and the right and left direction.

The roll holder 133 includes a holder core 133A, a left flange 133B, a right flange 133C and a rack pinion mechanism 133D which is a rack-and-pinion.

The holder core 133A has a substantially circular cylindrical shape and is laid between vicinities of upper ends of the left supporter 131 and the right supporter 132. The holder core 133A is rotatable around a center axis AX31 which is parallel to the right and left direction 9 in a circumferential direction θ31. The holder core 133A is inserted and fitted into the sheet core 41 (see FIG. 1B) so that an outer circumferential surface of the holder core 133A is in contact with an inner circumferential surface of the sheet core 41.

Each of the left flange 133B and the right flange 133C has a disc shape having a through hole formed at a center thereof. The holder core 133A is inserted and fitted into each of the through holes of the left flange 133B and the right flange 133C. The left flange 133B and the right flange 133C are respectively mounted on a left side and a right side of an in-roll center C11 in the right and left direction on the outer circumferential surface of the holder core 133A. The in-roll center C11 is an imaginary plane passes through a position of a center axis AX32 of a pinion gear 133E (see FIG. 5B) in the right and left direction, and is parallel to each of the up and down direction 7 and the front and rear direction 8. The left flange 133B and the right flange 133C slide along the outer circumferential surface of the holder core 133A in the right and left direction.

Figure 5B:
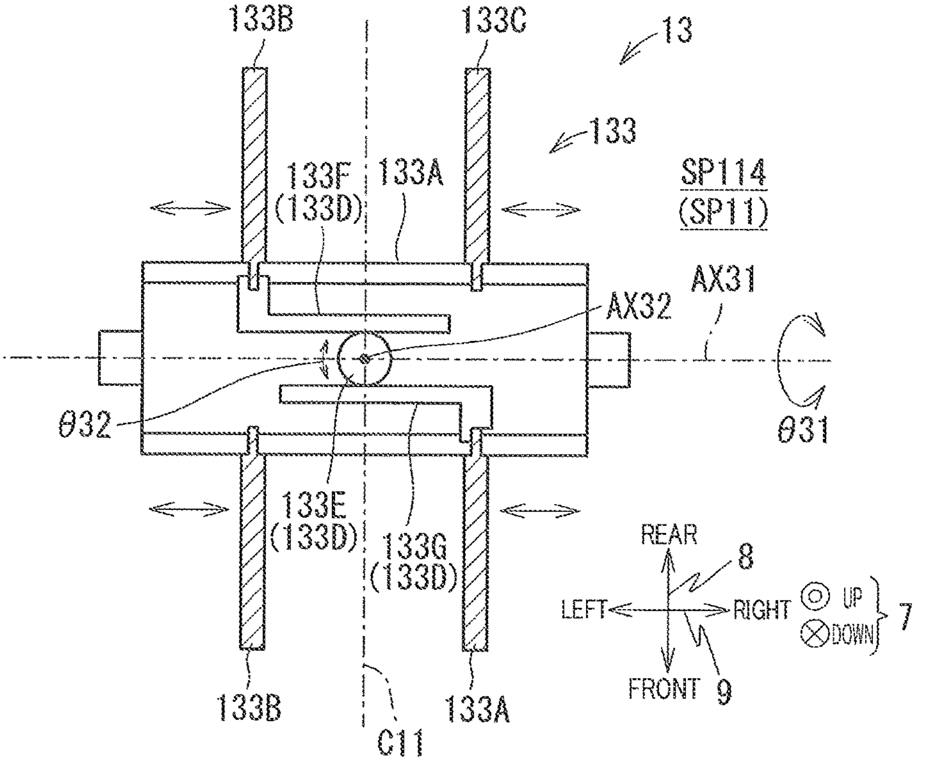
FIG. 5B is a cross-sectional view illustrating a detailed configuration of a roll holder.

In FIG. 5B, the rack pinion mechanism 133D includes the pinion gear 133E, a left rack gear 133F and a right rack gear 133G in the holder core 133A, and moves a first flange of the left flange 133B and the right flange 133C in a first direction of a rightward direction and a leftward direction by a first distance when a second flange of the left flange 133B and the right flange 133C moves in a second direction of the rightward direction and the leftward direction by the first distance. The left flange 133B and the right flange 133C come into contact with opposite ends of the sheet S which is mounted on the holder core 133A from opposite sides in the width direction 9A, and the sheet S is moved in a direction moving toward the in-roll center C11 (that is, in an inward direction) so that a center of the sheet S in the width direction 9A is positioned at the in-roll center C11 in the right and left direction 9.

It is noted that the roll supporter 13 is configured such that the roll supporter 13 is removable from the left supporter 131 and the right supporter 132 for replacing the sheet S. The right flange 133C is configured such that the right flange 133C is removable from the holder core 133A rightward.

In FIG. 5A, the driving force transmitting mechanism 134 includes gears and the like, and is located on a left side of the left supporter 131. The driving force transmitting mechanism 134 is mechanically connected to the roll holder 133 disposed between the left supporter 131 and the right supporter 132. The driving force transmitting mechanism 134 transmits driving force generated by the motor 28 to the roll holder 133. As a result, the roll holder 133 winds off the sheet S, which constitutes the roll body, from the sheet core 41 and winds the sheet S around the sheet core 41 by rotating in the circumferential direction θ31.

Tensioner

In FIG. 2, the tensioner 14 is located above the space B14 in the lower space SP111. The tensioner 14 includes a curved surface 141 and an upward facing surface 142 each having a shape symmetric with respect to the in-roll center C11 (see FIG. 5B). The curved surface 141 curves more at an upper end than at a lower end so as to substantially face upward at the upper end. The upward facing surface 142 is continues to an upper end and a front end of the curved surface 141, and is a flat surface extending in each of the front and rear direction and the right and left direction. A position of the upward facing surface 142 in the up and down direction is substantially the same as that of the output opening B13. A conveyance path 200 for the sheet S straightly extends from the upward facing surface 142 toward the output opening B13.

The sheet S which has been wound from the roll holder 133 is placed on the tensioner 14. The sheet S extends frontward so as to be curved along the tensioner 14. The tensioner 14 is urged rearward by an urging member such as a spring. Accordingly, tension is applied to the sheet S placed on the tensioner 14.

A Pair of Conveying Rollers

As illustrated in FIG. 2, the pair of conveying rollers 16 is forwardly spaced apart from the tensioner 14 in the inner space SP11. The pair of conveying rollers 16 includes the drive roller 161 and the pinch roller 162. The drive roller 161 and the pinch roller 162 are in contact with each other at a position substantially the same as a position of the upward facing surface 142 in the up and down direction, and nip the sheet S extending frontward from the tensioner 14. The drive roller 161 rotates around a rotation axis parallel to the right and left direction 9 by the driving force generated by the motor 28 (see FIG. 9). The pinch roller 162 is rotated by rotation of the drive roller 161. Accordingly, the pair of conveying rollers 16 further conveys the sheet S which has been wound from the roll body frontward, and conveys the sheet S wound around the roll body rearward. Since the pinch roller 162 is supported by the left wall 112F (see FIG. 1A) and the right wall 112E, as illustrated in FIG. 3B, the pinch roller 162 is moved together with the rear housing cover 112.

Rear Side Guide

Figure 6:
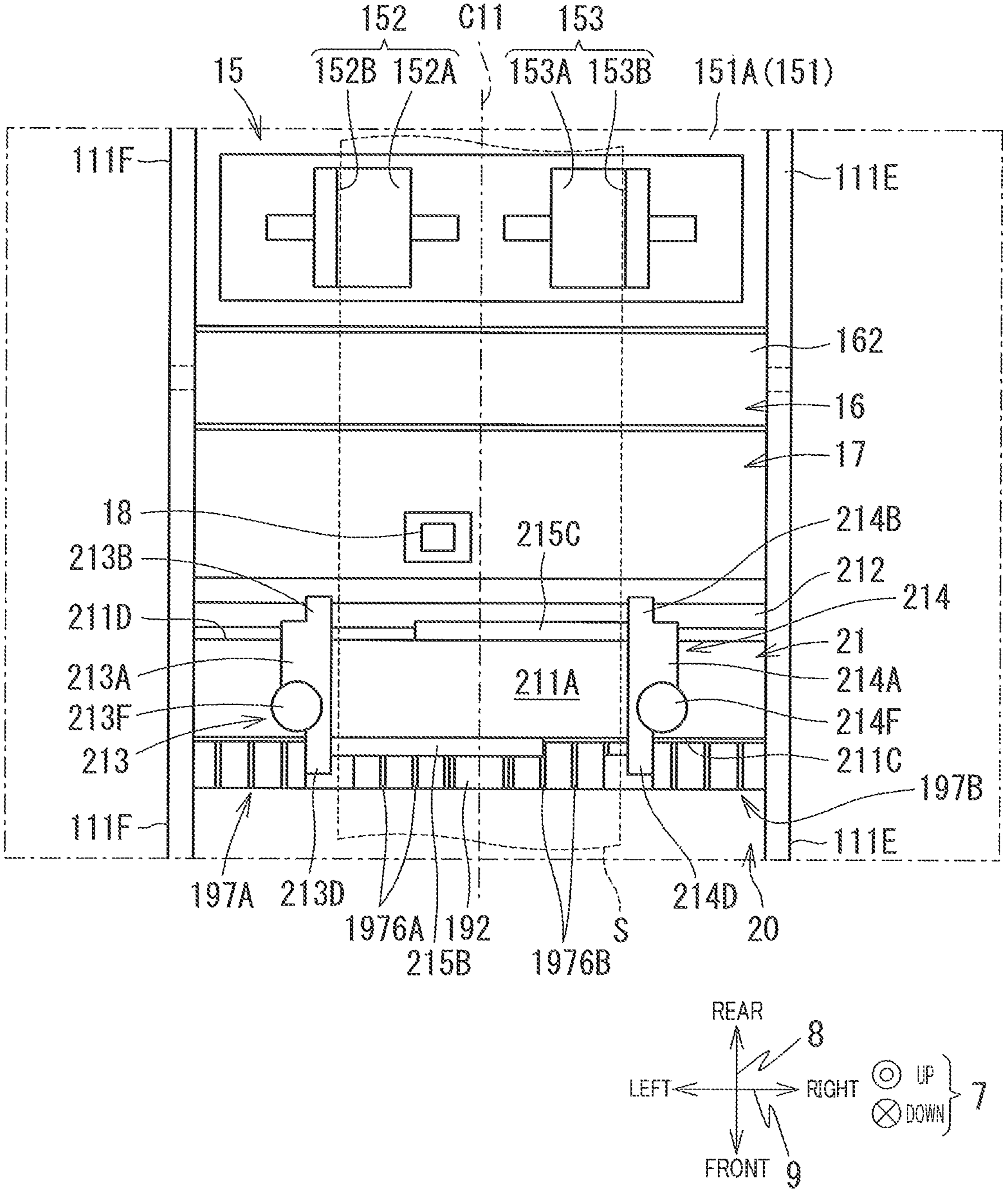
FIG. 6 is a schematic view illustrating a horizontal cross-sectional view of the image recording apparatus taken along line VI-VI in FIG. 1 and a view illustrating a main part of the image recording apparatus when viewed from an upper side thereof.
Figure 7A:
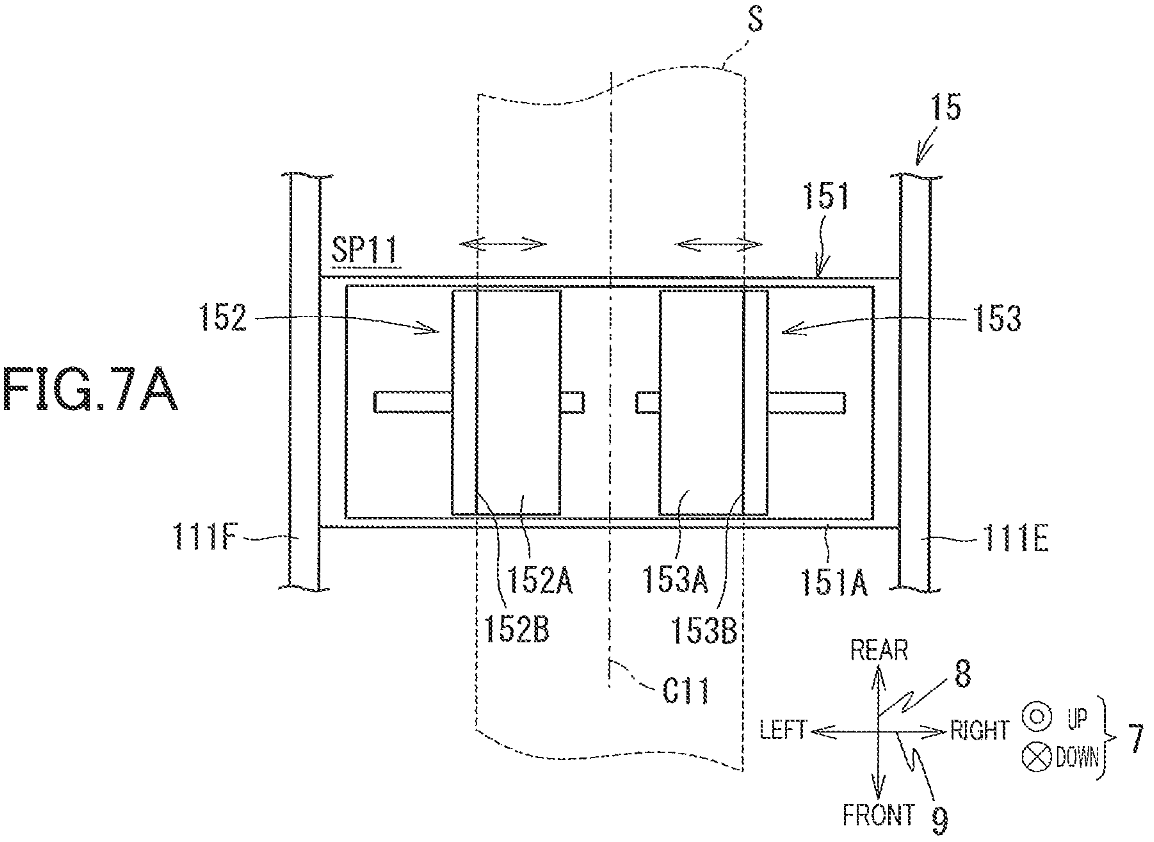
FIG. 7A is a top view of a rear side guide.
Figure 7B:
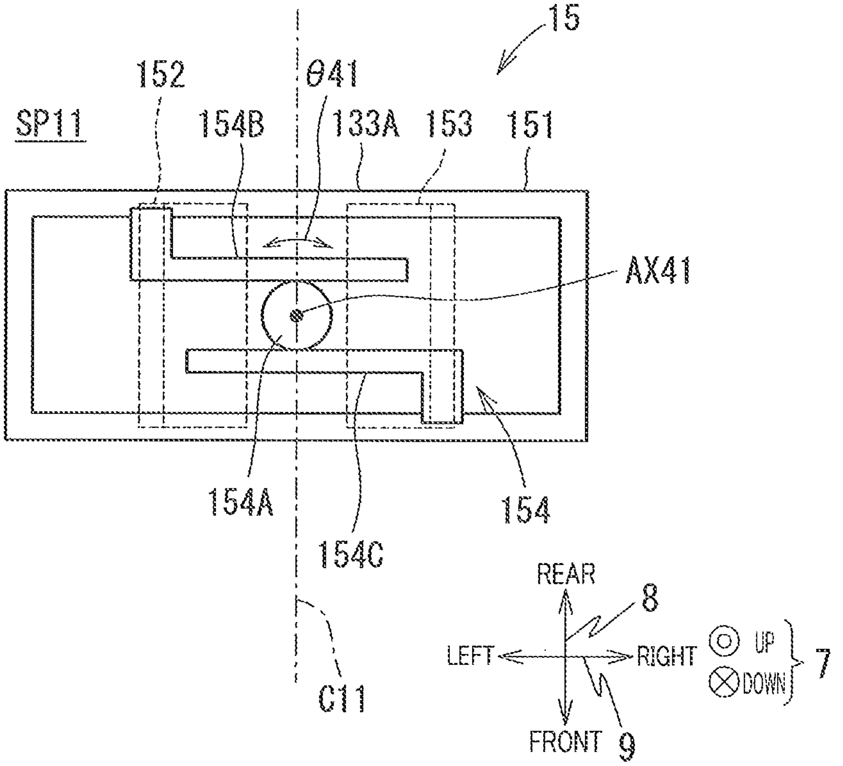
FIG. 7B is a schematic view illustrating a rack pinion mechanism of the rear side guide.

In FIG. 2 and FIG. 6, the rear side guide 15 is an example of a first side guide. The rear side guide 15 is located on a front side of the tensioner 14 and on a rear side of the pair of conveying rollers 16 in the inner space SP11. In FIG. 7A and FIG. 7B, the rear side guide 15 includes a base 151, a left guide member 152, a right guide member 153 and a rack pinion mechanism 154.

The base 151 has a shaped like a box elongated in the right and left direction and flat in the up and down direction. The base 151 includes an upper surface 151A having a substantially rectangular shape in a plan view, and the upper surface 151A is symmetric with respect to the in-roll center C11. A position of the upper surface 151A is substantially the same as that of the upward facing surface 142 (see FIG. 2), and the upper surface 151A defines a lower side of the conveyance path 200.

The left guide member 152 is mounted on the upper surface 151A on a left side of the in-roll center C11 so as to be movable in the right and left direction 9. The left guide member 152 has a L-shape when viewed from a front side, and includes an upward facing surface 152A and a rightward facing surface 152B. The upward facing surface 152A is substantially flush with the upper surface 151A. In other words, the upward facing surface 152A is parallel to the upper surface 151A so that a step is not formed between the upward facing surface 152A and the upper surface 151A. The rightward facing surface 152B extends upward from a left end of the upward facing surface 152A so that a lower end of the rightward facing surface 152B is connected to the left end of the upward facing surface 152A. The rightward facing surface 152B has a shape elongated in the front and rear direction.

The right guide member 153 includes an upward facing surface 153A and a leftward facing surface 153B, and has a shape in which the right guide member 153 and the left guide member 152 are symmetrical with respect to the in-roll center C11.

In FIG. 7B, the rack pinion mechanism 154 includes a pinion gear 154A, a left rack gear 154B, a right rack gear 154C, and moves a first guide member of the left guide member 152 and the right guide member 153 in a first direction of a rightward direction and a leftward direction by a first distance when a second guide member of the left guide member 152 and the right guide member 153 moves in a second direction of the rightward direction and the leftward direction by the first distance. The left guide member 152 and the right guide member 153 are respectively in contact with opposite ends of the sheet S from opposite sides, in the width direction 9A, which passes through between the left guide member 152 and the right guide member 153. Accordingly, a center of the sheet S in the width direction 9A is positioned at a center axis AX41 of the pinion gear 154A in the right and left direction 9. A position of the center axis AX41 in the right and left direction 9 is the same as that of the in-roll center C11, and the center axis AX41 is parallel to the in-roll center C11.

Lower Guide and Sensor

In FIG. 2 and FIG. 6, the lower guide 17 is made of resin. The lower guide is located on a front side of the pair of conveying rollers 16 and on a rear side of the belt conveying mechanism 19 and the front side guide 21 in the inner space SP11. The lower guide 17 includes an upper surface. The upper surface of the lower guide 17 has a shape symmetric with respect to the in-roll center C11 (see FIG. 5B) and substantially rectangular in plan view. The upper surface of the lower guide 17 is located at a position substantially the same as the upward facing surface 142 in the up and down direction.

A recess which is recessed downward is formed on the upper surface of the lower guide 17 at a position close to the in-roll center C11 in the right and left direction. The sensor 18 is disposed in the recess of the lower guide 17 so as not to protrude from the upper surface of the lower guide 17. The sensor 18 includes a light-emitting device and a light-receptive device. In the sensor 18, the light-emitting device emits light upward. In the sensor 18, the light-receptive device has a light-receptive surface, which faces upward, at a position close to the light-emitting device. The light-receptive surface outputs, to the controller 30, signals whose levels are different from one another in accordance with an amount of light received by the light-receptive surface.

Belt Conveying Mechanism

Figure 8:
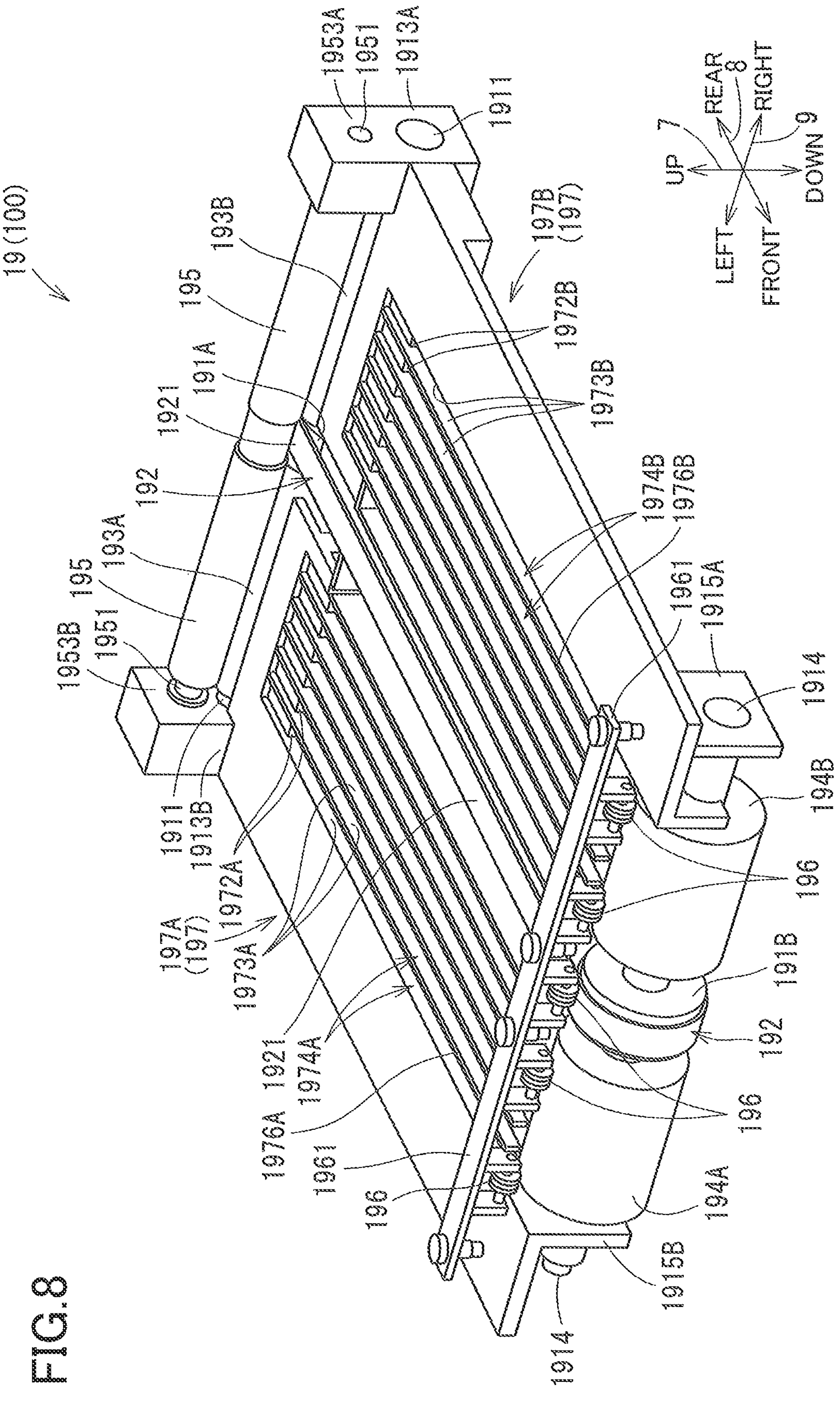
FIG. 8 is a perspective view illustrating a belt conveying mechanism.

As illustrated in FIG. 2 and FIG. 6, the belt conveying mechanism 19 is located on a front side of the lower guide 17 and on a rear side of the heater 22 in the front and rear direction 8. The belt conveying mechanism 19 is located just below the upward facing surface 142 in the up and down direction 7. In FIG. 8, the belt conveying mechanism 19 includes a rear pulley 191A, a front pulley 191B, an endless belt 192, a left rear roller 193A, a right rear roller 193B, a left front roller 194A, a right front roller 194B, a pinch roller 195, a plurality of contacting members 196 and a sucking platen 197. As illustrated in FIG. 9, the belt conveying mechanism 19 further includes the pump 29.

Rear Pulley and Front Pulley

In FIG. 8, each of the rear pulley 191A and the front pulley 191B has a shape symmetric with respect to the in-roll center C11 (see FIG. 5B).

Figure 10A:
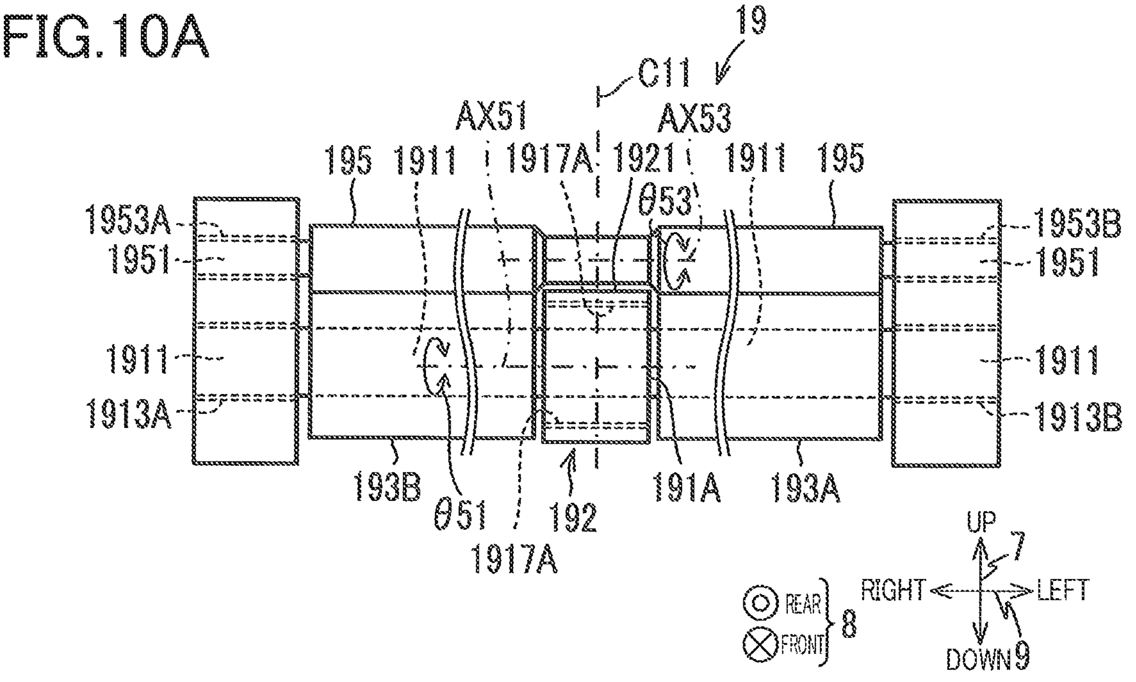
FIG. 10A is a rear view of the belt conveying mechanism.

In FIG. 2, the rear pulley 191A is located just in front of the lower guide 17. As illustrated in FIG. 10A, a rear shaft 1911 straightly extends rightward and leftward from an axis hole of the rear pulley 191A. A right end of the rear shaft 1911 is supported by a right bearing 1913A provided on the right wall 111E, and a left end of the rear shaft 1911 is supported by a left bearing 1913B provided on the left wall 111F. The rear shaft 1911 is rotatable around a rotation axis AX51 which is parallel to the right and left direction 9 in a circumferential direction θ51.

Figure 10B:
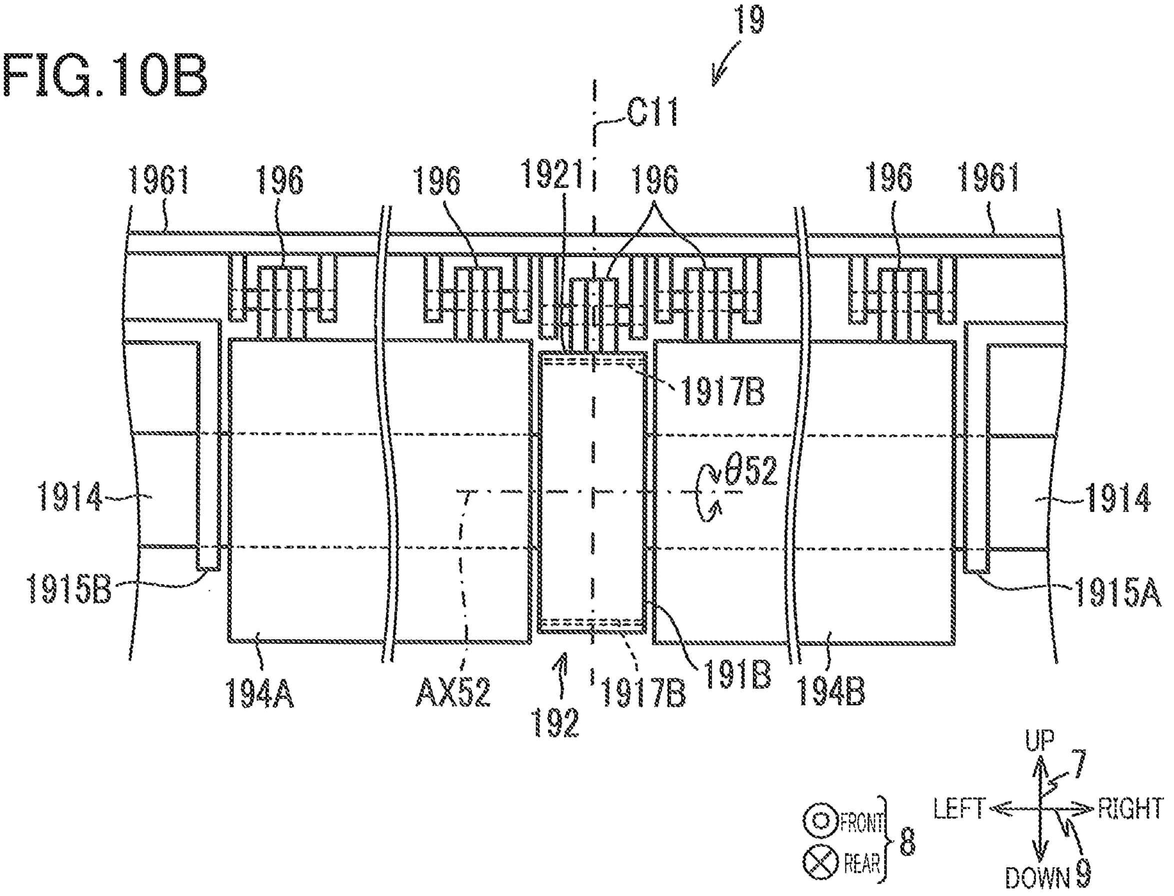
FIG. 10B is a front view of the belt conveying mechanism.

In FIG. 2, the front pulley 191B is located on a front side of the rear pulley 191A and on a rear side of the heater 22 (see FIG. 2). As illustrated in FIG. 10B, a front shaft 1914 straightly extends rightward and leftward from an axis hole of the front pulley 191B. A right end of the front shaft 1914 is supported by a right bearing 1915A provided on the right wall 111E, and a left end of the front shaft 1914 is supported by a left bearing 1915B provided on the left wall 111F. The front shaft 1914 is rotatable around a rotation axis AX52 which is parallel to the right and left direction 9 in the circumferential direction θ52.

As illustrated in FIG. 9, driving force generated by the motor 27 is transmitted to the front pulley 191B through the front shaft 1914. The front pulley 191B rotates in the circumferential direction θ52 by the driving force transmitted from the motor 27. In the image recording apparatus 100, the sheet S is conveyed frontward from the upward facing surface 142 in the conveyance path 200 when the sheet S is wound from the roll body. At this time, the front pulley 191B rotates in a forward direction, that is, the front pulley 191B rotates in a clockwise direction when viewed from a left side.

In FIG. 10A, the rear pulley 191A includes a rear engaging portion 1917A with which the endless belt 192 engages. In FIG. 10B, the front pulley 191B includes a front engaging portion 1917B with which the endless belt 192 engages. A center position between the rear engaging portion 1917A and the front engaging portion 1917B in the right and left direction is substantially the same as that of the in-roll center C11 in the right and left direction. Positions of upper ends of the rear engaging portion 1917A and the front engaging portion 1917B in the up and down direction are the same as each other.

Endless Belt

In FIG. 2, the endless belt 192 includes an upper end surface 1921 which is wound around the rear pulley 191A and the front pulley 191B. The upper end surface 1921 extends in a space between an upper ends of the rear pulley 191A and the front pulley 191B. The upper end surface 1921 extends in each of the front and rear direction and the right and left direction, and has a rectangular shape elongated in the front and rear direction in plan view. The upper end surface 1921 moves along the front and rear direction 8 in a space between upper ends of the rear engaging portion 1917A and the front engaging portion 1917B by frontward rotation of the front pulley 191B.

Left Rear Roller and Right Rear Roller

In FIG. 10A, each of the left rear roller 193A and the right rear roller 193B is a rubber roller and the like in which a roller core is covered by elastic material such as rubber. The left rear roller 193A and the right rear roller 193B are mounted on the rear shaft 1911 so as to be respectively located on a left side and a right side of the rear pulley 191A. Shapes of the left rear roller 193A and the right rear roller 193B are symmetrical each other with respect to the in-roll center C11. Upper ends of the left rear roller 193A and the right rear roller 193B in the up and down direction are below the upper end surface 1921. A distance between a left end of the left rear roller 193A and a right end of the right rear roller 193B in the right and left direction is greater than the maximum width of the sheet S.

Left Front Roller and Right Front Roller

In FIG. 10B, each of the left front roller 194A and the right front roller 194B is a rubber roller and the like, as the same as the left rear roller 193A. The left front roller 194A and the right front roller 194B are mounted on the front shaft 1914 so as to be respectively located on a left side and a right side of the front pulley 191B. Shapes of the left front roller 194A and the right front roller 194B are symmetrical each other with respect to the in-roll center C11. A distance between a left end of the left front roller 194A and a right end of the right front roller 194B is greater than the maximum width of the sheet S.

Pinch Roller

In FIG. 10A, the pinch roller 195 is a rubber roller and the like. A shaft 1951 protrudes rightward and leftward from a right end and a left end of the pinch roller 195. The right end of the shaft 1951 is supported by a right bearing 1953A provided on the right wall 111E, and the left end of the shaft 195 is supported by a left bearing 1953B provided on the left wall 111F. The shaft 1951 is rotatable around a rotation axis AX53 which is parallel to the right and left direction 9 in a circumferential direction θ53.

The pinch roller 195 extends rightward and leftward just above the rear pulley 191A, the left rear roller 193A and the right rear roller 193B. A distance between a right end and a left end of the pinch roller 195 in the right and left direction is substantially the same as a distance between a left end of the left rear roller 193A and a right end of the right rear roller 193B in the right and left direction.

The pinch roller 195 has different outside diameters in the right and left direction 9. More specifically, the pinch roller 195 is in contact with the left rear roller 193A and the right rear roller 193B from above. On the other hand, the pinch roller 195 is upwardly spaced apart from the upper end surface 1921 of the endless belt 192 at a center portion of the pinch roller 195 in the right and left direction 9 so as not to be in contact with the upper end surface 1921.

Plurality of Contacting Members

In FIG. 10B, each of the plurality of contacting members 196 is a spur, and is supported by a spur holder 1961 so as to be rotatable around a rotation axis which is parallel to the right and left direction 9 in a circumferential direction. The plurality of contacting members 196 are arranged in a low in the right and left direction so that adjacent two of the plurality of contacting members 196 are spaced apart from each other in the right and left direction. In the present embodiment, five contacting members 196 are provided. The left side two of the plurality of contacting members 196 are in contact with the left front roller 194A from right above. The right side two of the plurality of contacting members 196 are in contact with the right front roller 194B from right above. The center one of the plurality of contacting members 196 is in contact with a portion close to a front end of the endless belt 192 from right above. Each of the plurality of contacting members 196 is driven and rotated by rotations of the endless belt 192, the left front roller 194A and the right front roller 194B.

Sucking Platen

In FIG. 8, the sucking platen 197 is located between the rear pulley 191A and the front pulley 191B in the front and rear direction 8. The sucking platen 197 includes a left side portion 197A and a right side portion 197B respectively disposed on a left side and a right side of the endless belt 192.

In FIG. 8 and FIG. 9, the left side portion 197A includes a bottom wall 1971A, a plurality of rear walls 1972A and a plurality of partition walls 1973A. In the present embodiment, the plurality of rear walls 1972A are six, and the plurality of partition walls 1973A are seven, however, in FIG. 8, reference numbers "1973A" are attached to only three of the plurality of partition walls 1973A, and reference numbers "1972A" are attached to only two of the plurality of rear walls 1972A. In FIG. 9, illustrations of a part of the plurality of rear walls 1972A and the plurality of partition walls 1973A are dispensed with.

In FIG. 9, the bottom wall 1971A has a rectangular shape in plan view when viewed from an upper side, and extends in each of the front and rear direction 8 and the right and left direction 9. The bottom wall 1971A is located below the upper end surface 1921 in the up and down direction 7, and located on a left side of the upper end surface 1921 in the right and left direction 9. A rear end of the bottom wall 1971A is just forwardly spaced apart from the left rear roller 193A and the right rear roller 193B. A front end of the bottom wall 1971A is just rearwardly spaced apart from the left front roller 194A and the right front roller 194B.

In FIG. 8 and FIG. 9, the plurality of rear walls 1972A extend upward from a vicinity of the rear end of the bottom wall 1971A, and extend in each of the up and down direction and right and left direction. A position of an upper end of each of the plurality of rear walls 1972A in the up and down direction is lower than a position of the upper end surface 1921 in the up and down direction over an entire area of each of the plurality of rear walls 1972A in the right and left direction 9.

Each of the plurality of partition walls 1973A has a planar plate shape elongated in the front and rear direction and thinned in the right and left direction. The plurality of partition walls 1973A extend upward from positions on the bottom wall 1971A different from one another in the right and left direction. An upper end of each of the plurality of partition walls 1973A is located below the upper end surface 1921 over an entire area of each of the plurality of partition walls 1973A in the front and rear direction 8. The Upper ends of the plurality of partition walls 1973A constitute a left supporting surface 1976A of the sheet S on a left side of the upper end surface 1921. A position of the left supporting surface 1976A in the up and down direction is lower than a position of the upper end surface 1921 in the up and down direction.

Any Two of the plurality of partition walls 1973A adjacent to each other defines, together with the bottom wall 1971A and the plurality of rear walls 1972A, each of a plurality of left passages 1974A through which air passes. Each of the plurality of left passages 1974A is an opening which faces frontward and upward in a state in which the sheet S is not placed on the sucking platen 197.

A plurality of left suction openings 1975A, which are openings facing upward, are respectively formed at vicinities of rear ends of the plurality of left passages 1974A in the bottom wall 1971A.

The right side portion 197B includes a bottom wall 1971B, a plurality of rear walls 1972B, a plurality of partition walls 1973B, a plurality of right passages 1974B, a plurality of suction openings 1975B and a right supporting surface 1976B. The bottom wall 1971B and the bottom wall 1971A, the plurality of rear walls 1972B and the plurality of rear walls 1972A, the plurality of partition walls 1973B and the plurality of partition walls 1973A, the plurality of right passages 1974B and the plurality of left passages 1974A, the plurality of suction openings 1975B and the plurality of left suction openings 1975A, and the right supporting surface 1976B and the left supporting surface 1976A are respectively symmetrical each other with respect to the in-roll center C11. Accordingly, a detailed explanation of the right side portion 197B is dispensed with.

Motor, Pump and Controller

In FIG. 9, the motor 27 generates driving force for rotating the front pulley 191B and the drive roller 161 under control of the controller 30. The driving force is transmitted to the front shaft 1914 through gears and the like. The front shaft 1914 rotates in the circumferential direction θ52 by the driving force.

The pump 29 communicates with each of the plurality of left suction openings 1975A and the plurality of suction openings 1975B through a pipe 291. The pump 29 is driven under control of the controller 30 so as to suck air in the plurality of left passages 1974A from the plurality of left suction openings 1975A and suck air in the plurality of right passages 1974B from the plurality of suction openings 1975B.

Controller

The controller 30 includes a CPU, a ROM, a RAM, an EEPROM and an ASIC connected one another by an internal bus, and controls each of portions of the image recording apparatus 100.

Recording Head

In FIG. 2 and FIG. 6, the recording head 20 is an example of a recoding unit, and is a line head or a serial head. The recording head 20 is opposed to the upper end surface 1921 of the endless belt 192 and an upper end of the sucking platen 197 from above. The recording head 20 is disposed at a position forwardly spaced apart from the rear walls 1972A, 1972B on the sucking platen 197 and rearwardly spaced apart from a front end of the sucking platen 197 in the front and rear direction 8 so as to cross the sucking platen 197 in the right and left direction.

The recording head 20 includes a lower surface having a substantially rectangular shape in plan view as a nozzle face 201. A plurality of nozzles 202 are arranged in each of the front and rear direction and the right and left direction on the nozzle face 201. The recording head 20 stores ink supplied from the tank 12 (see FIG. 2) in an inner ink storage. The recording head 20 ejects the ink stored in the ink storage onto the plurality of labels 43 in the sheet S conveyed just below the recording head 20 under control of the controller 30. As a result, the ink in the ink storage is consumed. Ink is supplied to the ink storage from the tank 12 in accordance with the consumption of the ink.

Front Side Guide

Figure 11A:
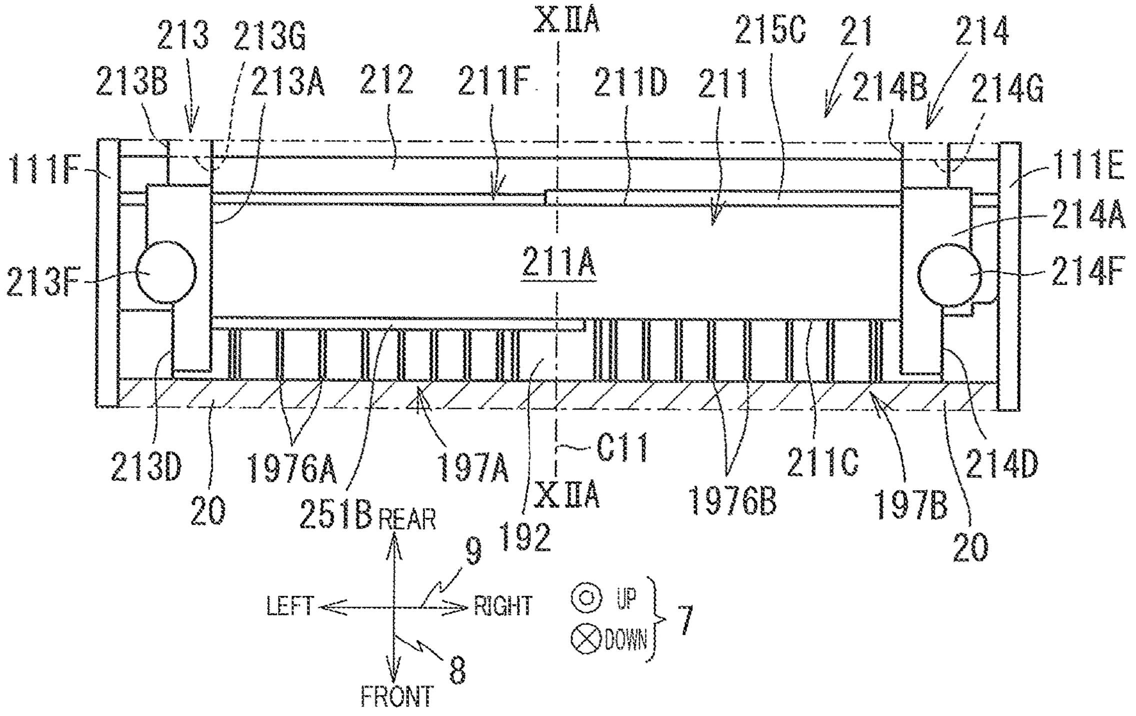
FIG. 11A is a top view of a front side guide.
Figure 11B:
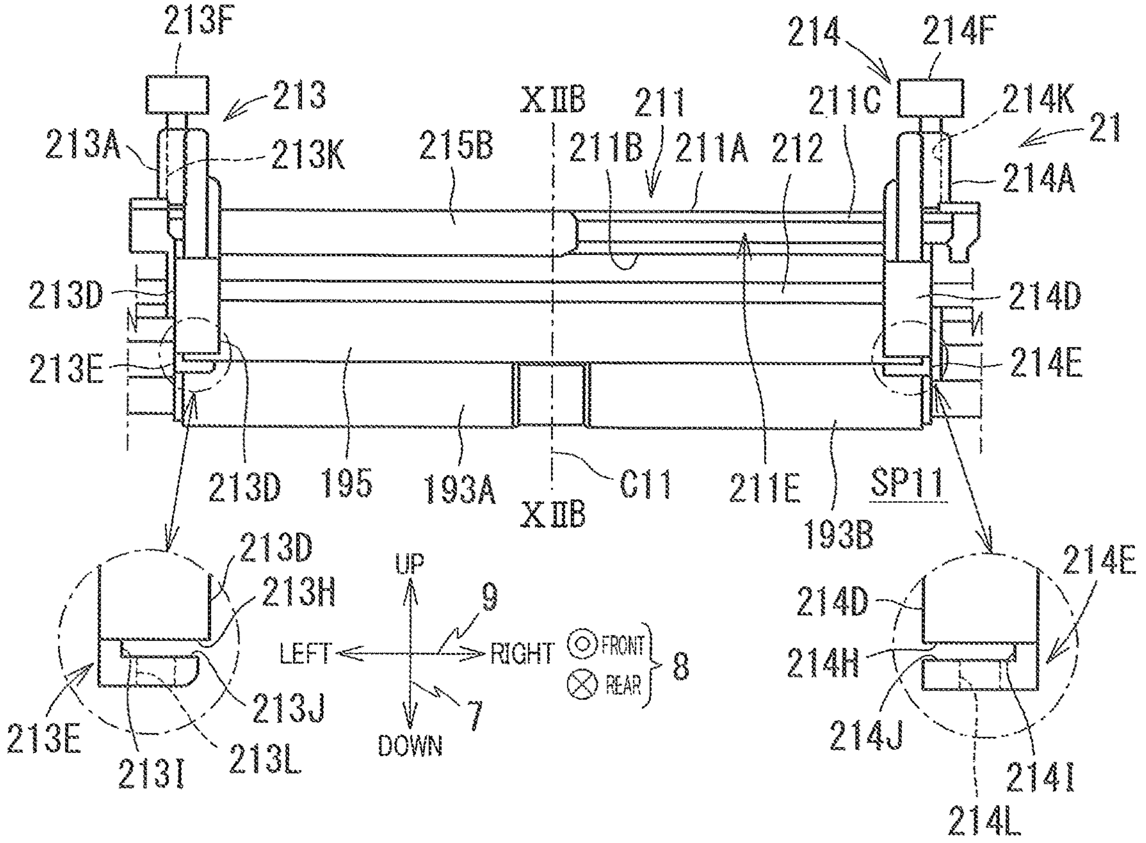
FIG. 11B is a front view of the front side guide.
Figure 12A:
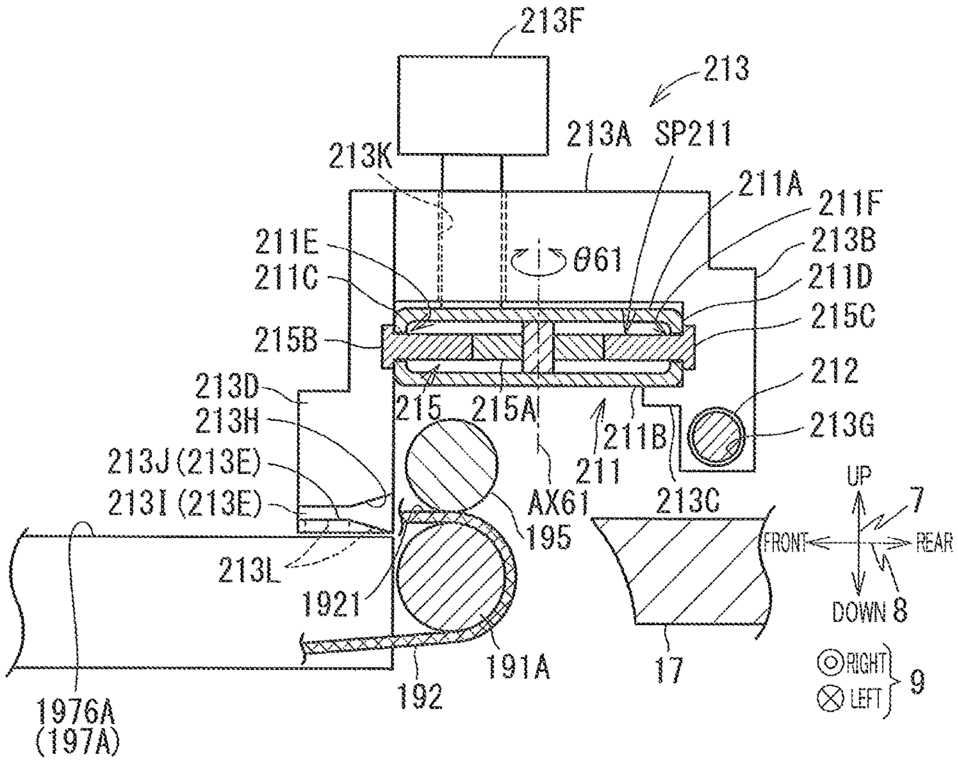
FIG. 12A is an elevational cross-sectional view of the front side guide taken along line XXII-XXII in FIG. 11A when viewed from a right side thereof.

In FIG. 2 and FIG. 6, the front side guide 21 is an example of a second side guide, and is located at a position on a front side of the pair of conveying rollers 16 and on a rear side of the recording head 20 in the inner space SP11. The front side guide 21 is located above the left supporting surface 1976A and the right supporting surface 1976B of the sucking platen 197 in the up and down direction 7. In FIG. 11A, FIG. 11B and FIG. 12A, the front side guide 21 includes a base 211, a guide rail 212, a left guide unit 213, a right guide unit 214 and a front rack pinion mechanism 215.

Base and Guide Rail

In FIG. 11A, FIG. 11B and FIG. 12A, the base 211 has a substantially rectangular parallelepiped shape thinned in the up and down direction 7 and elongated in the right and left direction 9. The base 211 is just spaced apart from the pinch roller 195 right above the pinch roller 195. The base 211 is fixed on the left wall 111F and the right wall 111E by fastening members such as screws at a left end and a right end of the base 211. As illustrated in FIG. 12A, the base 211 defines an inner space SP211 from an outside by an upper wall 211A, a lower wall 211B, a front wall 211C and a rear wall 211D. In FIG. 11A, FIG. 11B and FIG. 12A, a left front piercing hole 211E is formed in the front wall 211C. The left front piercing hole 211E has a rectangular shape elongated in the right and left direction when viewed from a front side, and pierces the front wall 211C in the front and rear direction. A right rear piercing hole 211F is formed at a position rearwardly opposed to the left front piercing hole 211E in the rear wall 211D. The right rear piercing hole 211F pierces the rear wall 211D in the front and rear direction.

In FIG. 11A, FIG. 11B and FIG. 12A, the guide rail 212 has a circular cylindrical shape elongated in the right and left direction 9. The guide rail 212 is located at a position spaced apart from the base 211 rearward and downward. The guide rail 212 is fixed to the left wall 111F and the right wall 111E at a left end and a right end of the guide rail 212.

Left Guide Unit

The left guide unit 213 includes a left body 213A, a left rear arm 213B, a left lower protruding portion 213C, a left front arm 213D, a left guide member 213E and a left screw 213F.

The left body 213A has a generally cubic shape compressed in the right and left direction 9. More specifically, a dimension of the left body 213A in the right and left direction is much less than a dimension of the base 211 in the right and left direction. A dimension of the left body 213A in the front and rear direction is slightly greater than a dimension of the base 211 in the front and rear direction. The left body 213A is placed on the upper wall 211A of the base 211 so as to be movable in the right and left direction 9.

In FIG. 12A, the left rear arm 213B extends from a rear end of the left body 213A rearward and downward so as to reach the guide rail 212. A left rear piercing hole 213G which pierces the left rear arm 213B in the right and left direction 9 is formed at a vicinity of a rear and lower end of the left rear arm 213B. The guide rail 212 is inserted and fitted into the left rear piercing hole 213G.

The left lower protruding portion 213C protrudes frontward from a lower end of the left body 213A, and the base 211 is interposed between the lower protruding portion 213C and the left body 213A. Accordingly, the left guide unit 213 is movable in the right and left direction 9 with respect to the base 211.

The left front arm 213D extends from a front end of the left body 213A forward and downward so as to reach a position right above a left rear corner of the left supporting surface 1976A. A left downward-facing surface 213H is formed at a lower end of the left front arm 213D. The left downward-facing surface 213H is a surface facing downward and extending in each of the front and rear direction and right and left direction. More specifically, the left downward-facing surface 213H is located just front of a rear end of the left supporting surface 1976A in the front and rear direction 8 and just right of a left end of the left supporting surface 1976A in the right and left direction 9.

The left guide member 213E is made of sheet metal and has a L-shape when viewed from a front side. The left guide member 213E is attached to the left downward-facing surface 213H, and is located right above the left rear corner of the left supporting surface 1976A. That is, the left guide member 213E overlaps the left rear corner of the left supporting surface 1976A in the up and down direction 7 (an example of an orthogonal direction) when viewed in the up and down direction. The left guide member 213E includes a left inward facing surface 213I and a left upward-facing surface 213J. The left inward facing surface 213I is an example of a first guide contacting surface of a pair of guide contacting surfaces. The left inward facing surface 213I is a flat surface facing rightward, extending downward from a left end of the left downward-facing surface 213H, and extending in each of the front and rear direction and the up and down direction in a space between the left downward-facing surface 213H and the left upward-facing surface 213J. The left upward-facing surface 213J is an example of a first guide supporting surface of a pair of guide supporting surfaces. The left upward-facing surface 213J is a surface facing upward and extending rightward from a lower end of the left inward facing surface 213I. In the following description, a space defined by the left inward facing surface 213I and the left upward-facing surface 213J together with the left downward-facing surface 213H will be referred to as a left guide space.

In FIG. 12A, a distance between the left downward-facing surface 213H and the left upward-facing surface 213J in the up and down direction is just greater than the maximum thickness of the sheet S and is substantially constant in the front and rear direction 8, except a portion close to a rear end of the left downward-facing surface 213H and the left upward-facing surface 213J. On the other hand, the portion close to the rear end of the left downward-facing surface 213H and the left upward-facing surface 213J becomes a tapered shape such that the distance between the left downward-facing surface 213H and the left upward-facing surface 213J in the up and down direction becomes large with getting closer to the rear end.

A plurality of left piercing holes 213L are formed in the left guide member 213E. The plurality of left piercing holes 213L pierce the left guide member 213E from the left upward-facing surface 213J to a lower end of the left guide member 213E in the up and down direction.

A left threaded hole 213K is formed in the left body 213A at right above the upper wall 211A of the base 211 so as to pierce the left body 213A in the up and down direction 7. The left screw 213F includes a screw portion which screws into the left threaded hole 213K. A lower end of the left screw 213F protrudes from a lower end of the left threaded hole 213K and reaches the upper wall 211A when a head portion of the left screw 213F is rotated. Accordingly, the left guide unit 213 is positioned with respect to the base 211.

Right Guide Unit

In FIG. 11A and FIG. 11B, the right guide unit 214 includes a right body 214A, a right rear arm 214B, a right lower protruding portion 214C, a right front arm 214D, a right guide member 214E and a right screw 214F as configurational parts. The right body 214A and the left body 213A, the right rear arm 214B and the left rear arm 213B, the right lower protruding portion 214C and the left lower protruding portion 213C, the right front arm 214D and the left front arm 213D, the right guide member 214E and the left guide member 213E, and the right screw 214F and the left screw 213F are symmetrical each other with respect to the in-roll center C11. Accordingly, a detailed explanation of the configurational parts of the right guide unit 214 is dispensed with. The right rear arm 214B has a right rear piercing hole 214G, at the lower end of the left rear arm 213B, into which the guide rail 212 is fitted. The right front arm 214D has a right downward-facing surface 214H at the lower end of the right front arm 214D. The right guide member 214E includes a right inward-facing surface 214I and a right upward-facing surface 214J. The right inward-facing surface 214I is an example of a second guide contacting surface of a pair of guide contacting surfaces. The right upward-facing surface 214J is an example of a second guide supporting surface of a pair of guide supporting surfaces. The right inward-facing surface 214I and the right upward-facing surface 214J define a right guide space together with the right downward-facing surface 214H. A right threaded hole 214K is formed in the right body 214A at a position right above the upper wall 211A of the base 211 so as to pierce the right body 214A in the up and down direction 7. The right screw 214F screws into the right threaded hole 214K.

Front Rack Pinion Mechanism

In FIG. 12A, the front rack pinion mechanism 215 includes a pinion gear 215A, a left rack gear 215B and a right rack gear 215C. The pinion gear 215A is located at a center of the base 211 in each of the front and rear direction and the right and left direction in the base 211. The pinion gear 215A is located between a right end of the left front piercing hole 211E and a left end of the right rear piercing hole 211F in the front and rear direction 8, and is located at a position substantially the same as that of the left front piercing hole 211E and the right rear piercing hole 211F in the up and down direction 7. The pinion gear 215A includes a rotation axis AX61 extending in the up and down direction 7, and is rotatable around the rotation axis AX61 in a circumferential direction θ61. The left rack gear 215B and the right rack gear 215C are common to mesh with the pinion gear 215A in the base 211 and extend in the right and left direction 9. The left rack gear 215B extends rightward along the front wall 211C of the base 211 from a vicinity of a front end of the left body 213A of the left guide unit 213. The left rack gear 215B includes a gear formed on a surface, of the left rack gear 215B, facing rearward. The gear of the left rack gear 215B meshes with the pinion gear 215A through the left front piercing hole 211E. The right rack gear 215C has a shape in which the rack gear 215C and the left rack gear 215B are symmetry of 180 degrees rotation in the circumferential direction θ61 The right rack gear 215C extends leftward along the rear wall 211D of the base 211 from a vicinity of a front end of the right body 214A of the right guide unit 214. The right rack gear 215C includes a gear formed on a surface, of the right rack gear 215C, facing frontward. The gear of the right rack gear meshes with the pinion gear 215A through the right rear piercing hole 211F.

The front rack pinion mechanism 215 moves a first guide unit of the left guide unit 213 and the right guide unit 214 in a first direction of the right and left direction by a distance when a second guide unit of the left guide unit 213 and the right guide unit 214 moves in a second direction of the right and left direction by the distance. Accordingly, the left inward facing surface 213I and the right inward-facing surface 214I are positioned so that a distance between the left inward facing surface 213I the in-roll center C11 becomes the same as a distance between the right inward-facing surface 214I and the in-roll center C11.

Other Configuration of Image Recording Apparatus

In FIG. 2, the heater 22 is disposed in front of the endless belt 192 so as to extend between the right wall 111E and the left wall 111F in the right and left direction 9. The heater 22 includes a contacting surface 22A extending in each of the front and rear direction and the right and left direction at substantially the same position in the up and down direction 7 as the upward facing surface 142. The heater 22 generates heat under control of the controller 30 so as to apply the heat to the sheet S which is passing through on the contacting surface 22A via the contacting surface 22A. Accordingly, the ink ejected on the sheet S is dried. That is, the image is fixed to the sheet S.

The heater cover 23 includes an opposed surface 23A which is spaced upward apart from the contacting surface 22A so as to be opposed to the contacting surface 22A. The opposed surface 23A prevents a user from coming into contact with the contacting surface 22A by covering the heat-generating contacting surface 22A.

The contacting surface 22A and the opposed surface 23A define the conveyance path 200 of the sheet S.

The image reading unit 24 is located on a front side of the heater 22, and includes the white reference board 24A and the CIS 24B. The white reference board 24A has a rectangular shape elongated in the right and left direction 9 in plan view. A right end and a left end of the white reference board 24A are respectively fixed to the right wall 111E and the left wall 111F, and the white reference board 24A extends in each of the front and rear direction and the right and left direction between the right wall 111E and the left wall 111F. The white reference board 24A includes a supporting surface 24C located at substantially the same position in the up and down direction 7 as the upward facing surface 142. The white reference board 24A supports the sheet S on the supporting surface 24C. The CIS 24B is a contact image sensor elongated in the right and left direction 9. A right end and a left end of the CIS 24B are respectively fixed to the right wall 113E and the left wall 113F of the front housing cover 113. The CIS 24B emits light from a light source such as LED. In the CIS 24B, light reflected by the sheet S placed on the white reference board 24A is collected onto a line sensor by a gradient index lens. The line sensor outputs electric signals to the controller 30 in accordance with an amount of incident light. In such a way, the CIS 24B reads the images recorded on the plurality of labels 43 of the sheet S.

As illustrated in FIG. 4, since the CIS 24B is supported by the left wall 113F and the right wall 113E, the CIS 24B pivots together with the front housing cover 113, and moves away or moves toward the white reference board 24A.

Figure 12B:
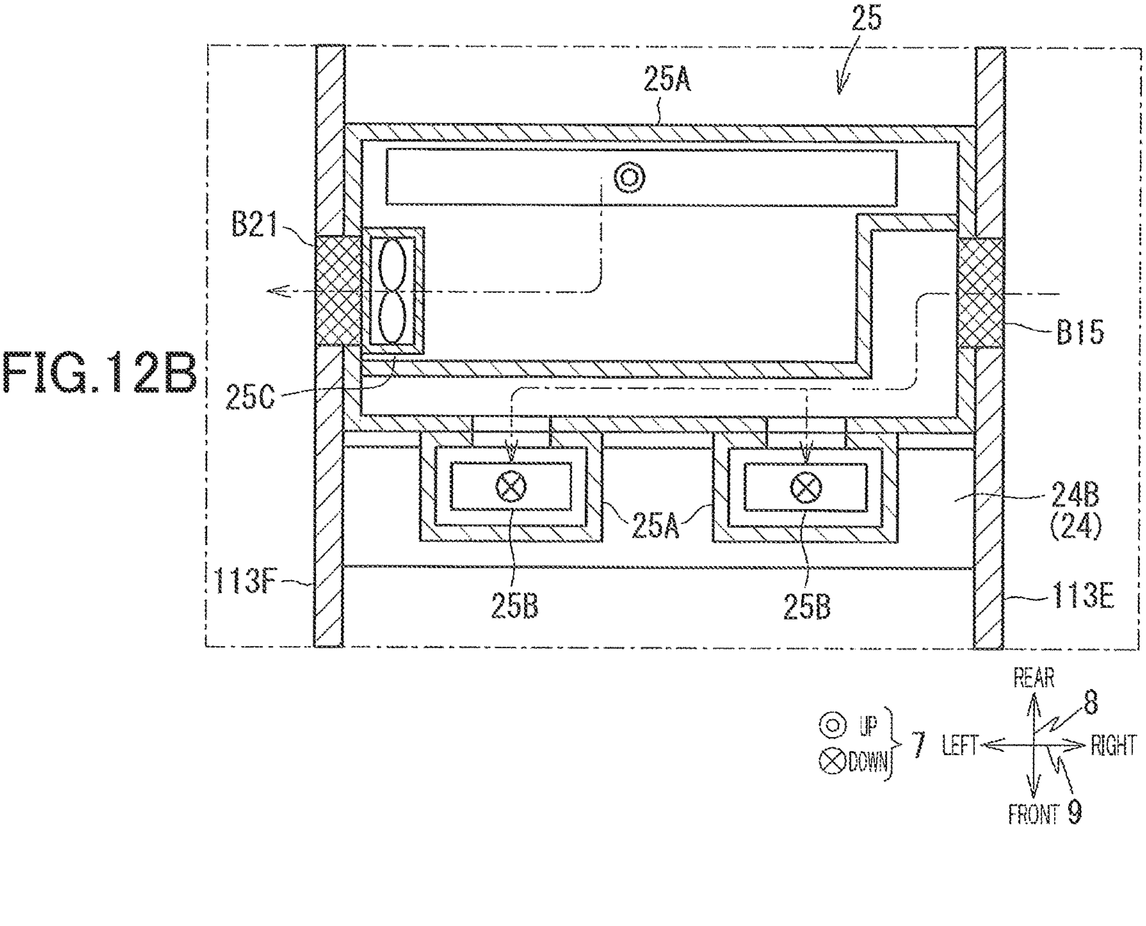
FIG. 12B is a horizontal cross-sectional view of a cooling unit.

In FIG. 2, the cooling unit 25 is located above the heater cover 23 and the image reading unit 24. In FIG. 12B, the cooling unit 25 has a substantially rectangular parallelepiped shape elongated in the right and left direction 9. A right end and a left end of the cooling unit 25 are respectively fixed to the right wall 113E and the left wall 113F. A suction opening B15 is provided on the right wall 113E, and a vent opening B21 is provided on the left wall 113F. A duct 25A is provided on the front housing cover 113, and the duct 25A defines a passage (see an arrow) extending from the suction opening B15 to the vent opening B21. The duct 25A is provided with a suction fan 25B and a vent fan 25C. The suction fan 25B rotates under control of the controller 30 so as to take the outside air of the housing 11 into the duct 25A through the suction opening B15. As illustrated in FIG. 2, the suction fan

25B rotates so as to send an air current to the CIS 24B of the image reading unit 24 located below the duct 25A. In FIG. 12B, the vent fan 25C is located just upstream of the vent opening B21 in the passage defined by the duct 25A. The vent fan 25C rotates under control of the controller 30 so as to let the air surrounding the CIS 24B flow into a space between the heater 22 and the heater cover 23 (see FIG. 2). The vent fan 25C brings the air into the duct 25A again, and discharges the air to the outside of the housing 11 through the vent opening B21.

The cutter 26 is located on a front side of the image reading unit 24. Under control of the controller 30, the cutter 26 cuts, along the right and left direction 9, the sheet S conveyed in the conveyance path 200. The cut sheet S is discharged from the output opening B13 to the outside of the housing 11.

Operations of Image Recording Apparatus

The user puts the sheet S in the image recording apparatus 100 so as to cause the image recording apparatus 100 to record the image on the sheet S. When putting the sheet S in the image recording apparatus 100, the user first opens the right cover 114 (see FIG. 1) and mounts the sheet S on the roll supporter 13 (see FIG. 5A). As a result, the width direction 9A of the sheet S is orthogonal to each of the up and down direction 7 and the front and rear direction 8, and is parallel to the right and left direction 9.

Next, as illustrated in FIG. 3B, the user moves the rear housing cover 112 from the closed position P11 (see FIG. 3A) to the open position P12 (see FIG. 3B), and exposes the tensioner 14, the rear side guide 15, the drive roller 161, the lower guide 17, the sensor 18 and the front side guide 21 from the rear opening AP112.

Next, the user winds off a distal end of the sheet S mounted on the roll supporter 13 from the roll body, and causes the distal end to pass the space B14 (see FIG. 2). After the user winds the sheet S on the tensioner 14, the user causes the sheet S to pass through a space between the left guide member 152 and the right guide member 153 (see FIG. 7A). The user further moves at least one of the left guide member 152 and the right guide member 153 rightward or leftward so as to position a center of the sheet S in the width direction 9A to a position of the in-roll center C11 in the right and left direction (see FIG. 5B). After that, the user causes a vicinity of the distal end of the sheet S to come into contact with an upper end of the drive roller 161 (see FIG. 3B).

After the user, if necessary, eases the left screw 213F and the right screw 214F (see FIG. 11B), the user moves at least a first guide member of the left guide member 213E and the right guide member 214E in a first direction of the right and left direction, positions a position of the left inward facing surface 213I in the right and left direction to a position at which a left end of the sheet S passes, and positions the right inward-facing surface 214I to a position at which a right end of the sheet S passes by the front rack pinion mechanism 215. After the positioning, the user tightens the left screw 213F and the right screw 214F (see FIG. 11B), and fixes the left guide member 213E and the right guide member 214E to a position in the right and left direction on the base 211. That is, the left screw 213F and the right screw 214F fixes the left guide member 213E and the right guide member 214E with respect to the width direction 9A (see FIG. 1B) of the sheet S, as an example of a fixing member.

Next, the user returns the rear housing cover 112 to the closed position P11 so as to close the right cover 114. As a result, the sheet S has been put in the image recording apparatus 100.

After the sheet S has been put, in the image recording apparatus 100, the controller 30 (see FIG. 9) outputs the control signals to the pump 29 in response to receipt of operations of the operation panel 116 by the user so as to start driving the pump 29. As a result, the pump 29 applies a suction pressure to each of the plurality of left suction openings 1975A and the plurality of suction openings 1975B so as to start sucking the surrounding air from each of the plurality of left suction openings 1975A and the plurality of suction openings 1975B.

Next, the controller 30 executes a positioning process. In the positioning process, the controller 30 outputs control signals to the motor 27 so as to rotate the drive roller 161 and the front pulley 191B in the forward direction. The controller 30 further outputs control signals to the motor 28 so as to rotate the roll holder 133 in the forward direction. Linear velocities of the drive roller 161 and the front pulley 191B, and a linear velocity of the roll holder 133 are suitably set. The pair of conveying rollers 16 is an example of a pair of conveying rollers, and rotates in the forward direction so as to nip the vicinity of the distal end of the sheet S and start conveying the sheet S forward. The roll holder 133 rotates in the forward direction so as to start winding off the sheet S from the roll body. The rear side guide 15, which is an example of a first side guide, comes into contact with the opposite ends of the sheet S in the width direction 9A, which is conveyed from the roll holder 133 through the tensioner 14, at a position on a rear side of the pair of conveying rollers 16 (an example of an upstream side in a conveying direction) so as to control a position of the sheet S in the right and left direction. As a result, the sheet S is started to be conveyed forward (an example of a conveying direction) in the conveyance path 200, and the distal end of the sheet S passes through a position right above the sensor 18 (see FIG. 2) from a rear side toward a front side of the sensor 18 soon. When the sheet S exists at a position above the light-receptive surface of the sensor 18, the sensor 18 outputs a high-level signal, a voltage value of which is greater than a threshold value, to the controller 30. When the sheet S does not exist the position above the light-receptive surface of the sensor 18, the sensor 18 outputs a low-level signal, a voltage value of which is equal to or less than the threshold value, to the controller 30. When the signal output from the sensor 18 switches from the low-level signal to the high-level signal, the controller 30 determines that the distal end of the sheet S reaches the position above the sensor 18, and stops outputting the control signals to the motors 27, 28. Accordingly, the distal end of the sheet S is stopped at the position above the sensor 18, and the positioning process has been completed.

When receiving printing data indicating images to be recorded on the sheet S from an information processing apparatus (for example a PC) which is communicatable with the image recording apparatus 100, the controller 30 executes an image recording control. In the image recording control, the controller 30 rotates the drive roller 161 and the front pulley 191B in the forward direction by outputting the control signals to the motor 27. The controller 30 further rotates the roll holder 133 in the forward direction by outputting the control signals to the motor 28. Linear velocities of the drive roller 161 and the front pulley 191B and a linear velocity of the roll holder 133 are suitably set. As a result, the pair of conveying rollers 16 starts conveying the sheet S forward from a position right above the sensor 18. The roll holder 133 pays out the sheet S from the roll body.

After the sheet S is started to be conveyed, a center of the distal end of the sheet S comes into contact with a rear end of the endless belt 192 (see FIG. 8). A right side and a left side of the center of the distal end of the sheet S are nipped between each of the left rear roller 193A and the right rear roller 193B, and the pinch roller 195. The upper end surface 1921 has a coefficient of friction higher than those of the left supporting surface 1976A and the right supporting surface 1976B, and conveys the sheet S by friction force. The left rear roller 193A and the right rear roller 193B convey the sheet S together with the pinch roller 195 by nipping and rotating. As a result, the distal end of the sheet S is conveyed forward from the left rear roller 193A and the right rear roller 193B toward the front side guide 21 (see FIG. 11A) in the conveyance path 200.

A vicinity of a left end of the distal end of the sheet S is conveyed to a rear end of the left guide space, that is a space defined by the left downward-facing surface 213H, the left upward-facing surface 213J and the left inward facing surface 213I (see FIG. 12A). A vicinity of a right end of the distal end of the sheet S is conveyed to a rear end of the right guide space. As described above, in each of the left guide space and the right guide space, since a dimension in the up and right direction of each of the left guide space and the right guide space at a front end portion of is less than the dimension in the up and down direction at a rear end portion of each of the left guide space and the right guide space, a posture of the sheet S becomes parallel to each of the front and rear direction and right and left direction so as to become stable as the sheet S is conveyed close to the front end portion of each of spaces of the left guide space and the right guide space. Moreover, the left inward facing surface 213I and the right inward-facing surface 214I limit the position of the sheet S in the right and left direction. In this way, the front side guide 21 comes into contact with the opposite end of the sheet S in the right and left direction at a position on a front side of the pair of conveying rollers 16 and on a rear side of the recording head 20 in the front and rear direction 8, as an example of a second side guide. The sheet S is conveyed from the front side guide 21 so as to be parallel to each of the front and rear direction and the right and left direction without being inclined with respect to the front and rear direction 8. That is, the front side guide 21 prevents the sheet S from being conveyed obliquely.

Moreover, the pump 29 is driven while the sheet S is conveyed in the left guide space and the right guide space. Since the air is sucked through each of the plurality of left suction openings 1975A and the plurality of suction openings 1975B (see FIG. 9) by driving of the pump 29, the air in a space between the sheet S and each of the left upward-facing surface 213J and the right upward-facing surface 214J (see FIG. 11B) is flown toward the plurality of left suction openings 1975A and the plurality of suction openings 1975B (see FIG. 9) through the plurality of left piercing holes 213L (see FIG. 11B, FIG. 12A) and a plurality of right piercing holes 214L (see FIG. 11B). As a result, the sheet S is conveyed forward while being sucked on the left upward-facing surface 213J and the right upward-facing surface 214J. Accordingly, the sheet S becomes further closer to parallel to each of the front and rear direction and right and left direction so that the posture of the sheet S becomes stable.

As described above, since the posture of the sheet S becomes stable in the left guide space and the right guide space of the front side guide 21, a skew of the sheet S does not occur, or the occurring shew of the sheet S is corrected by the left downward-facing surface 213H, the left upward-facing surface 213J, the left inward facing surface 213I, the right downward-facing surface 214H, the right upward-facing surface 214J and the right inward-facing surface 214I. After that, the sheet S is conveyed toward the left supporting surface 1976A and the right supporting surface 1976B of the sucking platen 197 through the front end of each of the left guide space and the right guide space.

After having been conveyed to the sucking platen 197, the sheet S is conveyed forward while the sheet S is in contact with the upper end surface 1921, the left supporting surface 1976A and the right supporting surface 1976B. While being conveyed, the sheet S closes an upper end of each of the plurality of left passages 1974A and the plurality of right passages 1974B. Since the pump 29 is driven in this state, an air flow flowing from a front end of each of the plurality of left passages 1974A and the plurality of right passages 1974B toward a corresponding one of the plurality of left suction openings 1975A and the plurality of suction openings 1975B occurs. As a result, an air pressure in each of the plurality of left passages 1974A and the plurality of right passages 1974B decreases lower than an air pressure in a space above the sheet S, and the sheet S is suctioned on the left supporting surface 1976A and the right supporting surface 1976B. It is noted that since a coefficient of friction of each of the left supporting surface 1976A and the right supporting surface 1976B is lower than that of the upper end surface 1921, the sheet S slides forward on the left supporting surface 1976A and the right supporting surface 1976B.

The distal end of the sheet S is conveyed forward by a friction conveyance of the endless belt 192 and a nipping conveyance of the left rear roller 193A and the right rear roller 193B on each of the upper end surface 1921 in the conveyance path 200, the left supporting surface 1976A and the right supporting surface 1976B. After that, the distal end of the sheet S is nipped between each of the left front roller 194A and the right front roller 194B, and the plurality of contacting members 196. Then, the sheet S is conveyed by the friction conveyance of the endless belt 192 and the nipping conveyance of the left front roller 194A and the right front roller 194B such that the distal end of the sheet S is successively fed forward by the belt conveying mechanism 19.

While the sheet S is conveyed in a space between the left rear roller 193A and the left front roller 194A and between the right rear roller 193B and the right front roller 194B in the front and rear direction 8, the controller 30 controls the recording head 20 to eject ink from the plurality of nozzles 202 based on printing data. As a result, the recording head 20 records the image on the plurality of labels 43 in the sheet S at a position on a front side (an example of a position downstream in a conveying direction) of the pair of conveying rollers 16, as an example of a recording unit.

Effects

According to the present embodiment, as illustrated in FIG. 6 and so on, since the image recording apparatus 100 includes the front side guide 21, the sheet S is guided such that the skew of the sheet S does not occur between the pair of conveying rollers 16 and the recording head 20, more specifically, at a position just rear (that is, a position just upstream in a conveying direction) of the recording head 20. Accordingly, it is possible to reduce the occurrence of the skew of the sheet S at a position right below the recording head 20. As a result, it is possible to reduce the rear side guide 15 in size, in the front and rear direction 8, located on a rear side (that is, at a position upstream in a conveying direction) of the pair of conveying rollers 16. Therefore, it is possible to reduce the image recording apparatus 100 in size in the front and rear direction.

When the sheet S is conveyed forward by the pair of conveying rollers 16, a rearward friction force generated by rotation of the roll body, a weight of the sheet S and the like is applied to the sheet S. The friction force is not constant in the width direction 9A of the sheet S. The not-constant friction force causes the skew of the sheet S in the conveyance path 200. Moreover, when the skew of the sheet S, which is a continuously-fed paper, occurs once, positions of the opposite ends of the sheet S at a particular position in the conveyance path 200 accumulatively deviate in the right and left direction as the sheet S is conveyed. In the present embodiment, however, since the occurrences of the skew of sheet S at a plurality of positions in the conveyance path 200 are prevented by the rear side guide 15 and the front side guide 21, it is possible to reduce the occurrence of the skew of the sheet S which is the continuously-fed paper.

In the present embodiment, the left inward facing surface 213I and the left upward-facing surface 213J are located closer to the recording head 20 than the left supporting surface 1976A in the up and down direction 7, and the left inward facing surface 213I and the left upward-facing surface 213J overlap the left supporting surface 1976A when viewed in the up and down direction 7 (in a plan view). That is, the left inward facing surface 213I and the left upward-facing surface 213J are located on a front side of a rear end of the left supporting surface 1976A in the front and rear direction 8. The right inward-facing surface 214I and the right upward-facing surface 214J overlap the right supporting surface 1976B in the up and down direction 7 at a position closer to the recording head 20 than the right supporting surface 1976B in the up and down direction 7. As a result, a distance between the front end of each of the left guide space and the right guide space and each of the left supporting surface 1976A and the right supporting surface 1976B becomes small. Accordingly, since it is difficult to cause the skew of the sheet S in a space between the front end of each of the left guide space and the right guide space and each of the left supporting surface 1976A and the right supporting surface 1976B, it is possible to reduce the image recording apparatus 100 in size in the front and rear direction.

In the present embodiment, as described above, the air in the space between the sheet S and each of the left upward-facing surface 213J and the right upward-facing surface 214J (see FIG. 11B) in the left guide space and the right guide space outflows downward through the plurality of left piercing holes 213L (see FIG. 11B, FIG. 12A) and the plurality of right piercing holes 214L (see FIG. 11B) by driving of the pump 29. Accordingly, since the sheet S is suctioned on the left upward-facing surface 213J and the right upward-facing surface 214J, it is possible to stabilize the posture of the sheet S.

In the present embodiment, since the left guide member 213E and the right guide member 214E are fixed by the left screw 213F and the right screw 214F, the left guide member 213E and the right guide member 214E do not deviate in the right and left direction. Accordingly, it is difficult to cause the skew of the sheet S in which the sheet S is conveyed obliquely, in the width direction 9A, with respect to the conveying direction in the space between the pair of conveying rollers 16 and the recording head 20.

In the present embodiment, since the left guide member 213E and the right guide member 214E is movable in the right and left direction by the front rack pinion mechanism 215, it is possible to prevent occurrences of the skew for the sheet S with a plurality of sheet widths different from one another, and to correct the occurring skew of the sheet S.

Modifications

In the present embodiment, the left guide member 152 of the rear side guide 15 and the left guide unit 213 of the front side guide 21 move independently each other in the right and left direction. As a result, the right guide member 153 of the rear side guide 15 and the right guide unit 214 of the front side guide 21 also move independently each other in the right and left direction.

Figure 13:
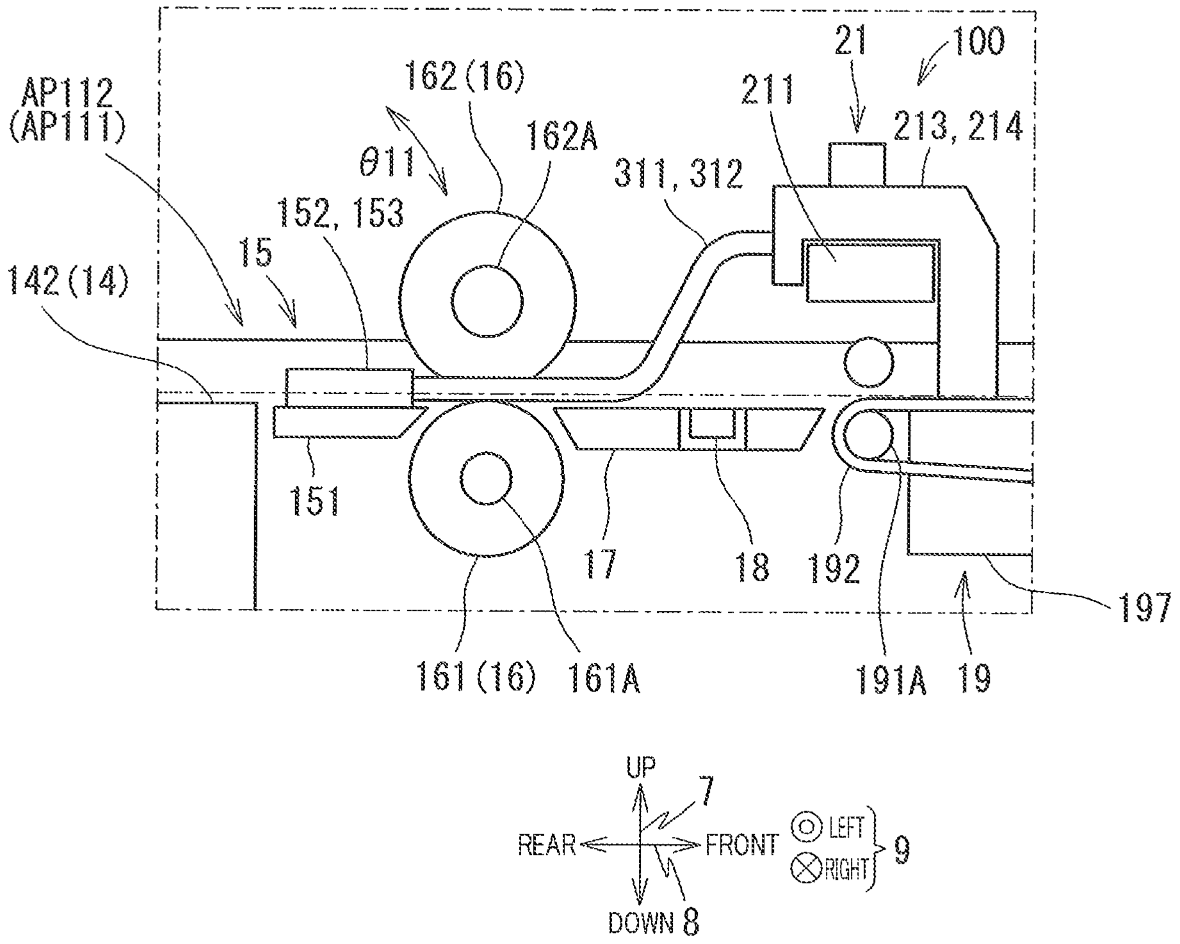
FIG. 13 is a schematic view illustrating a modification of the image recording apparatus.

However, the present disclosure is not limited to this. As illustrated in FIG. 13, the image recording apparatus 100 may further include a left coupling member 311 coupling the left guide member 152 (an example of a third guide member) and the left guide unit 213 (an example of a first guide member) each other and a right coupling member 312 coupling the right guide member 153 (an example of a fourth guide member) and the right guide unit 214 (an example of a second guide member) each other.

It is noted that since FIG. 13 is a side view of a main part of the modification when viewed from a left side, the left coupling member 311 and the right coupling member 312 are illustrated so as to overlay each other in the right and left direction 9. The same manner is applied to a combination of the left guide member 152 and the right guide member 153, and a combination of the left guide unit 213 and the right guide unit 214.

Due to the left coupling member 311, when a first guide member of the left guide member 152 and the left guide unit 213 moves a first direction of the right and left direction, a second guide member of the left guide member 152 and the left guide unit 213 moves in the first direction so as to interlock together with the movement of the first guide member.

In a manner similar to the above, due to the right coupling member 312, when a first guide member of the right guide member 153 and the right guide unit 214 moves a first direction of the right and left direction, a second guide member of the right guide member 153 and the right guide unit 214 moves in the first direction so as to interlock together with the movement of the first guide member.

In the present embodiment, since the rear housing cover 112 opens or closes (see FIG. 3A and FIG. 3B), the left coupling member 311 and the right coupling member 312 need to be located so as to interfere the pinch roller 162 which rotates in the circumferential direction θ11 together with the rear housing cover 112. More specifically, the left coupling member 311 and the right coupling member 312 extend from the left guide unit 213 and the right guide unit 214, and respectively reach the left guide member 152 and the right guide member 153 so as to pass through a space below a shaft 162A of the pinch roller 162 without entering in a range of motion of the pinch roller 162.

In the modification in FIG. 13, each of the left coupling member 311 and the right coupling member 312 passes through a space between the shaft 162A of the pinch roller 162 and an axis 161A of the drive roller 161. However, the present disclosure is not limited to this. Each of the left coupling member 311 and the right coupling member 312 may pass through a space below the axis 161A of the drive roller 161.

According to the present modification, since the user needs not to operate the rear side guide 15 and the front side guide 21 individually, it is possible to achieve good usability.

It is possible to easily position the sheet S in the width direction 9A by the front side guide 21.

OTHER MODIFICATIONS

In the present embodiment, the method of image recording is a ink-jet method, however, the present disclosure is not limited to this. The method of image recording may be an electrophotographic method or a thermal transfer method.

Figure 1B:
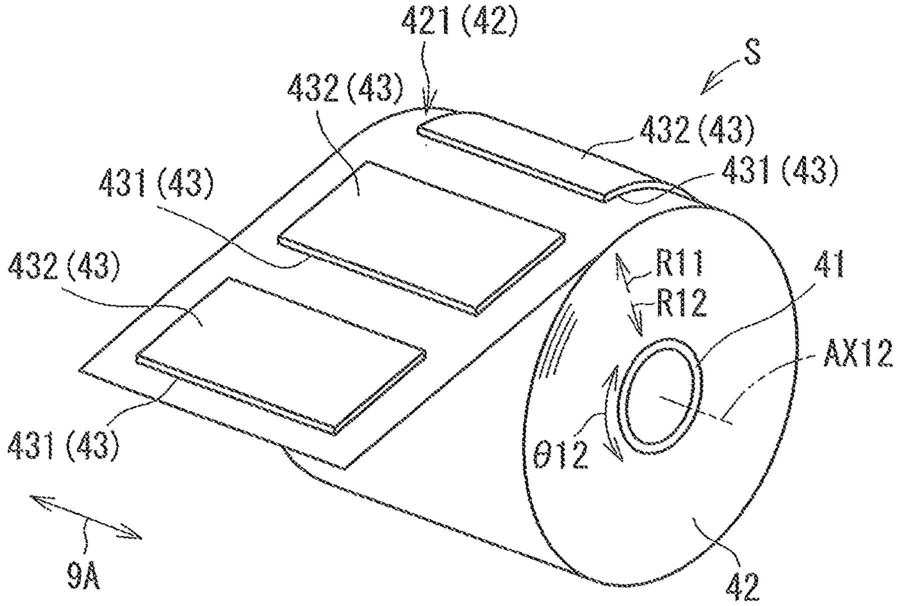
FIG. 1B is a perspective view illustrating an external appearance of a sheet (a label roll paper)

The sheet S in FIG. 1B includes the sheet core 41. However, the present disclosure is not limited to this. The sheet S may not include the sheet core 41. In this case, the separator 42 is wound like a roll shape such that a through hole having a circular cylindrical shape is formed at a center of the separator 42.

The sheet S in FIG. 1B is a roll paper having labels. However, the present disclosure is not limited to this. The sheet S may be a roll paper, that is, a continuously-fed paper constituting a roll body. In this case, the image is recorded on the roll paper itself.

The sheet S in FIG. 1B includes the plurality of labels 43. However, the present disclosure is not limited to this. The sheet S may be constituted of a separator and a single label which is temporally adhered on the separator. In this case, the separator and the single label constitute the continuously-fed paper constituting the roll body, and the image is recorded on a recording surface of the single label.

Alternatively, the sheet S may be a fan-fold paper or a cut paper. In a case of the fan-fold paper, the image recording apparatus 100 does not include the roll supporter 13. In a case of the cut paper, the image recording apparatus 100 may include a supply tray and a discharge tray in place of the roll supporter 13.

In FIG. 2, the image recording apparatus 100 includes the heater 22 for fixing the image onto the sheet S. However, the present disclosure is not limited to this. The image recording apparatus 100 may fix the image on the sheet S by an ultraviolet irradiation device or a halogen heater in place of the heater 22.

In the present embodiment, the sucking platen 197 sucks the sheet S on the left supporting surface 1976A and the right supporting surface 1976B by reducing the air pressure in each of the plurality of left passages 1974A and the plurality of right passages 1974B by the air current. However, the present disclosure is not limited to this. The sucking platen 197 may suck the sheet S on a suction platen by sucking the sheet S through a plurality of suction holes formed in the plate-shape suction platen. Alternatively, the sucking platen 197 may suck the sheet S on a suction platen by an electrostatic suction force which is generated when the suction platen body is charged.

The image recording apparatus 100 may include a platen which does not suck the sheet S in place of the sucking platen 197.

The endless belt 192 mat be what is called a suction belt.

In the present embodiment, all of the left flange 133B, the right flange 133C, the left guide member 152, the right guide member 153, the left guide unit 213 and the right guide unit 214 are slidable in the right and left direction. However, the present disclosure is not limited to this. In a case where the right cover 114 is provided on the right wall 111E as in a manner similar to the present embodiment, the left flange 133B, the left guide member 152 and the left guide unit 213 may be fixed so as not to move in the right and left direction, and the right flange 133C, the right guide member 153 and the right guide unit 214 may be movable in the right and left direction. It is noted that the left flange 133B, the left guide member 152 and the left guide unit 213 may be movable in the right and left direction, and the right flange 133C, the right guide member 153 and the right guide unit 214 may be fixed so as not to be movable in the right and left direction.

What is claimed is:

1. An image recording apparatus, comprising:

a pair of conveying rollers configured to convey a sheet in a conveying direction;

a recording unit located downstream of the pair of conveying rollers in the conveying direction and configured to record an image on the sheet;

a first side-guide located upstream of the pair of conveying rollers in the conveying direction and configured to come into contact with at least one of opposite ends of the sheet in a width direction orthogonal to the conveying direction, the first side-guide being movable in the width direction; and a second side-guide located downstream of the pair of conveying rollers and upstream of the recoding unit in the conveying direction, the second side-guide being configured to come into contact with at least one of opposite ends of the sheet in the width direction and movable in the width direction, wherein the second side-guide comprises:

a first guide member including (i) a first guide-contacting surface being in a contact with a first end of the opposite ends of the sheet in the width direction and (ii) a first guide-supporting surface connecting the first guide-contacting surface and configured to support the sheet, the first guide member being movable in the width direction, and a second guide member including (i) a second guide-contacting surface being in contact with a second end of the opposite ends of the sheet in the width direction and (ii) a second guide-supporting surface connecting the second guide-contacting surface and configured to support the sheet, the second guide member being movable in the width direction, and a rack-pinion mechanism configured to interlock a movement of the first guide member and a movement of the second guide member.

2. The image recording apparatus according to claim 1, wherein the sheet is a roll body, and wherein the image recording apparatus further comprises a roll supporting member supporting the roll body so as to be rotatable around a central axis of the roll body.

3. The image recording apparatus according to claim 1, further comprising a platen including a supporting surface opposed to the recording unit and supporting the sheet, wherein the second-side guide includes:

the first guide-contacting surface and the second guide-contacting surface configured to respectively come into contact with the opposite ends of the sheet in the width direction and movable so as to be spaced apart from each other in the width direction; and the first guide-supporting surface and the second guide-supporting surface respectively connecting the first guide-contacting surface and the second guide-contacting surface so as to support the sheet at positions closer to the recording unit than to the supporting surface, and wherein the first guide-supporting surface and the second guide-supporting surface overlap the supporting surface when viewed in an orthogonal direction orthogonal to the each of the conveying direction and the width direction.

4. The image recording apparatus according to claim 3, wherein a first opening is formed on the supporting surface of the platen, wherein the image recording apparatus further comprises a pump configured to apply a suction pressure to the first opening, and wherein a second opening to which the suction pressure is applied is formed on each of the first guide-supporting and the second guide-supporting surface.

5. The image recording apparatus according to claim 1, further comprising a fixing member fixing the second side guide to a position in the width direction.

6. The image recording apparatus according to claim 1, wherein the first side guide includes:

a third guide member being in contact with the first end of the sheet in the width direction and movable in the width direction; and a fourth guide member being in contact with the second end of the sheet in the width direction and movable in the width direction, wherein the image recording apparatus further comprises:

a first coupling member configured to couple the first guide member and the third guide member so as to interlock a movement of the first guide member and a movement of the third guide member; and a second coupling member configured to couple the second guide member and the fourth guide member so as to interlock a movement of the second guide member and a movement of the fourth guide member.

7. The image recording apparatus according to claim 1, further comprising a sensor located downstream of the pair of conveying rollers and upstream of the second side guide in the conveying direction, the sensor being configured to output two signals, which are different from each other, depending on whether the sensor is detecting the sheet or not.

8. An image recording apparatus, comprising:

a pair of conveying rollers configured to convey a sheet in a conveying direction;

a recording unit located downstream of the pair of conveying rollers in the conveying direction and configured to record an image on the sheet;

a first side-guide located upstream of the pair of conveying rollers in the conveying direction and configured to come into contact with at least one of the opposite ends of the sheet in a width direction orthogonal to the conveying direction, the first side-guide being movable in the width direction; and a second side-guide located downstream of the pair of conveying rollers and upstream of the recording unit in the conveying direction, the second side-guide being configured to come into contact with at least one of the opposite ends of the sheet in the width direction and movable in the width direction, a platen including a supporting surface opposed to the recording unit and supporting the sheet, wherein the second guide includes:

a pair of guide-contacting surfaces configured to respectively come into contact with the opposite ends of the sheet in the width direction and movable so as to be spaced apart from each other in the width direction; and a pair of guide-supporting surface respectively connecting the pair of guide-contacting surfaces so as to support the sheet at positions closer to the recording unit than to the supporting surface, wherein the pair of guide-supporting surfaces overlaps the supporting surface when viewed in an orthogonal direction orthogonal to each of the conveying direction and the width direction, wherein a first opening is formed on the supporting surface of the platen, wherein the image recording apparatus further comprises a pump configured to apply a suction pressure to the first opening, and wherein a second opening to which the suction pressure is applied is formed on each of the pair of the guide-supporting surfaces.

* * * * *